(12) United States Patent
Shibuya et al.

(10) Patent No.: US 7,177,242 B2
(45) Date of Patent: Feb. 13, 2007

(54) CONDENSER WITH FIRST AND SECOND PHOTODETECTORS WITH THREE SECTIONS EACH AND HAVING FOCAL POINTS BEFORE AND AFTER THE SURFACE OF DETECTORS

(75) Inventors: Giichi Shibuya, Tokyo (JP); Teiichiro Oka, Tokyo (JP)

(73) Assignee: TDK Corporation, Tokyo (JP)

( * ) Notice: Subject to any disclaimer, the term of this patent is extended or adjusted under 35 U.S.C. 154(b) by 549 days.

(21) Appl. No.: 10/699,855

(22) Filed: Nov. 4, 2003

(65) Prior Publication Data

US 2004/0151087 A1    Aug. 5, 2004

(30) Foreign Application Priority Data

Nov. 5, 2002  (JP) ............................. 2002-321019

(51) Int. Cl.
*G11B 7/00* (2006.01)
(52) U.S. Cl. .................................................. 369/44.32
(58) Field of Classification Search .............. 369/44.32
See application file for complete search history.

(56) References Cited

U.S. PATENT DOCUMENTS

| | | | | |
|---|---|---|---|---|
| 4,873,678 A | * | 10/1989 | Nakamura et al. | 369/13.29 |
| 5,119,355 A | * | 6/1992 | Yamamoto et al. | 369/44.12 |
| 5,253,237 A | * | 10/1993 | Miyake et al. | 369/44.37 |
| 5,278,401 A | | 1/1994 | Takishima et al. | |
| 5,553,050 A | * | 9/1996 | Yang | 369/112.15 |
| 6,399,932 B1 | | 6/2002 | Wals | |
| 2001/0033528 A1 | | 10/2001 | Sano et al. | |
| 2002/0057359 A1 | | 5/2002 | Tadano et al. | |
| 2003/0075669 A1 | | 4/2003 | Tadaki | |

FOREIGN PATENT DOCUMENTS

| | | |
|---|---|---|
| EP | 0 228 620 A2 | 7/1987 |
| JP | 10-214436 | 8/1998 |
| JP | 2000-57616 | 2/2000 |
| JP | 2000-171346 | 6/2000 |
| JP | 2002-39915 | 2/2002 |
| JP | 2002-55024 | 2/2002 |

* cited by examiner

*Primary Examiner*—Gautam R. Patel
(74) *Attorney, Agent, or Firm*—Oblon, Spivak, McClelland, Maier & Neustadt, P.C.

(57) ABSTRACT

To provide a light receiving device, a light detecting device, and an optical signal reproducing device each of which allows one to perform many different computations in detecting aberration amounts and focus error quantities without requiring exact position relations between laser light to be received and light receiving elements, and between the light receiving elements. First and second light receiving elements $43_+$ and $43_-$ are used which receive condensed light at positions equidistantly spaced from an focal point X before and after the light images, respectively.

20 Claims, 18 Drawing Sheets

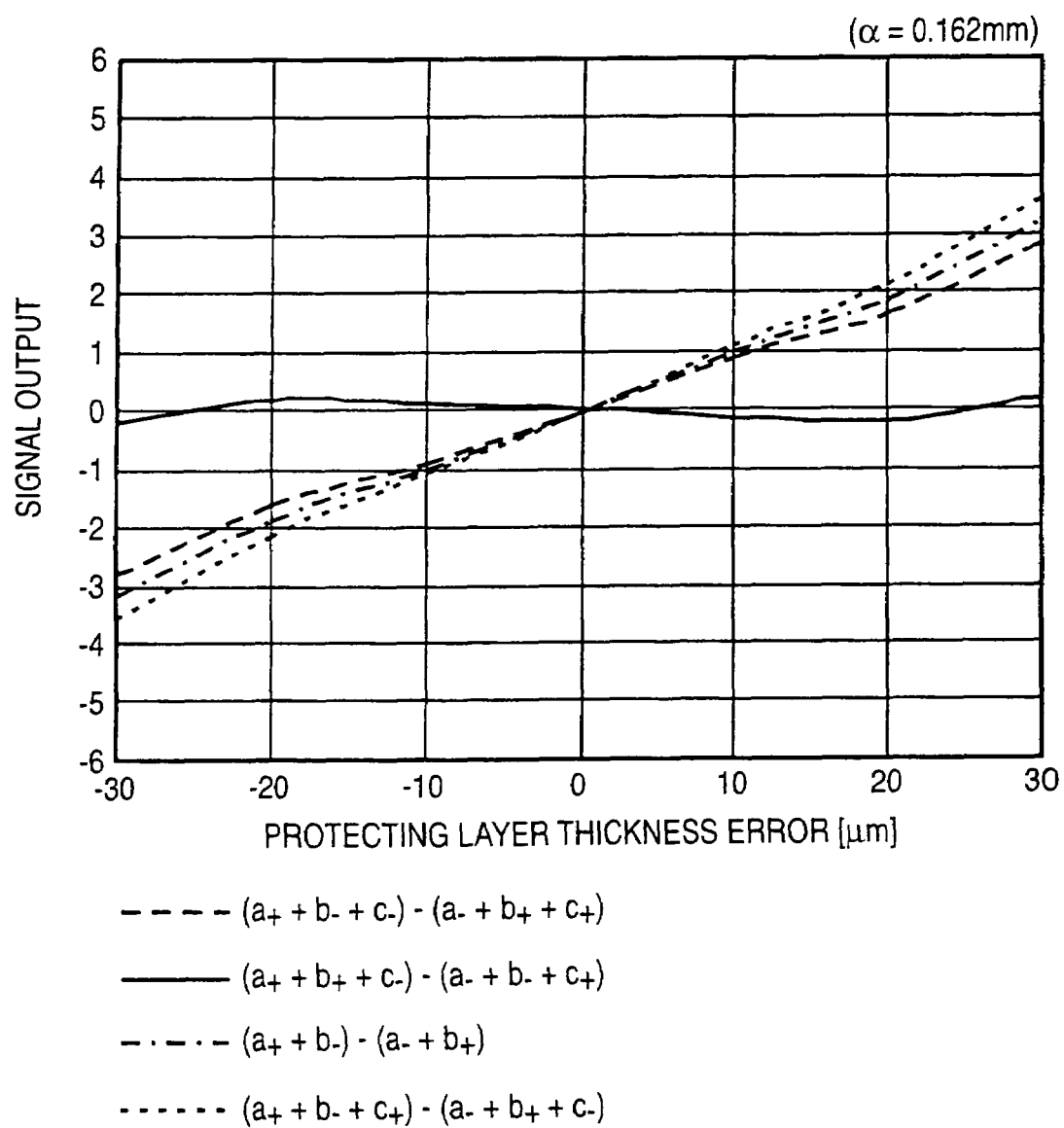

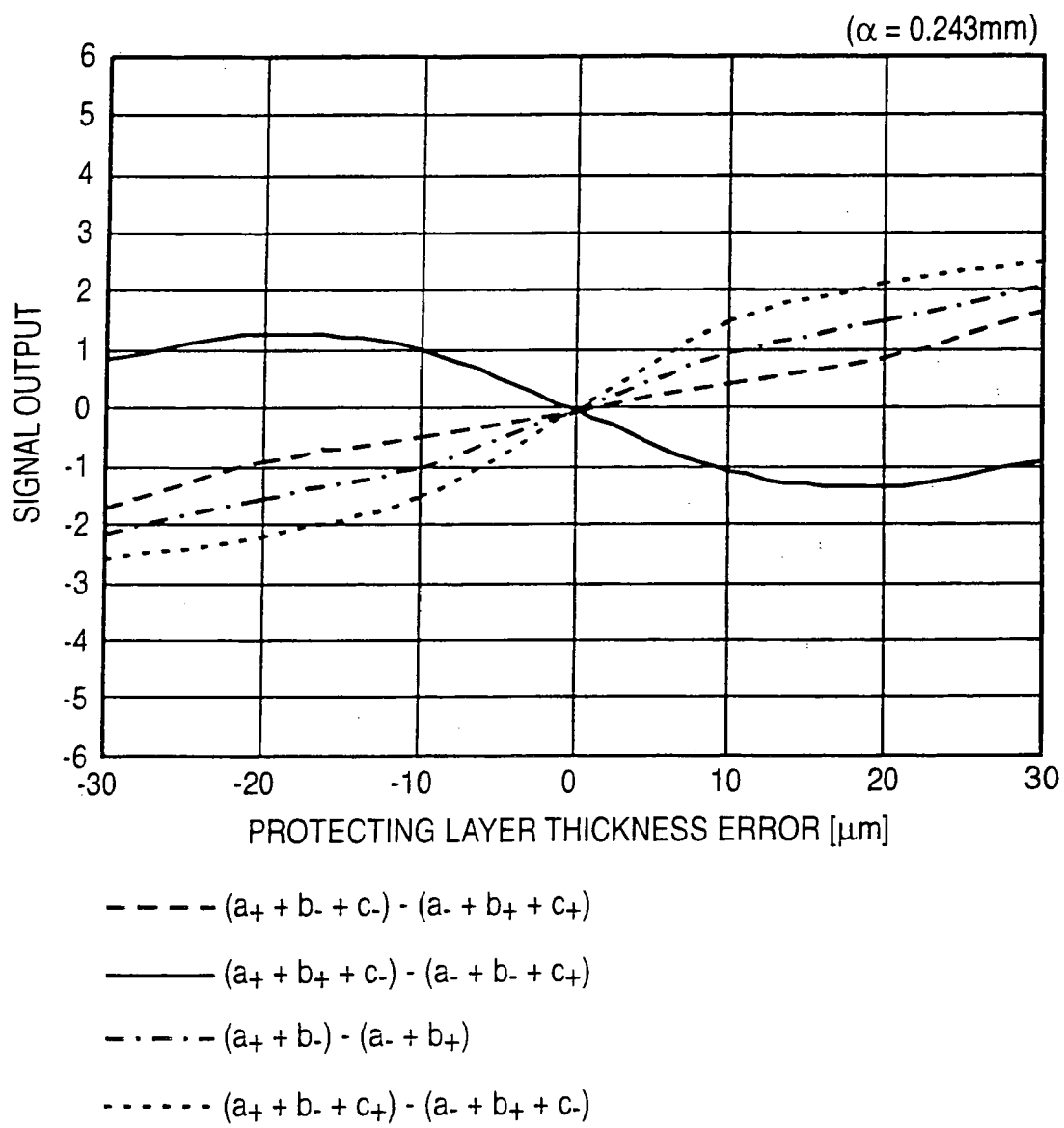

CONDENSER WITH FIRST AND SECOND PHOTODETECTORS WITH THREE SECTIONS EACH AND HAVING FOCAL POINTS BEFORE AND AFTER THE SURFACE OF DETECTORS

BACKGROUND OF THE INVENTION

1. Field of the Invention

The present invention relates to an aberration amount detecting device, and a light receiving device. More particularly, the invention relates to a device for detecting light at positions before and after a focal point of condensed light.

2. Description of the Related Art

Nowadays, the number of types of optical recording media is increasing. The protecting layers having some different thicknesses are also provided. In reading out information from an optical disc, when a thickness of the protecting layer is deviated from a design value, or it is inclined to an optical axis of the object lens, a spherical aberration occurs in the wave front of an impinging light beam, and it hinders the image formation of a micro-spot.

Recently, some short-wave, high recording density optical heads are each designed to have a high numerical aperture of 0.85 or higher in order to reduce a diameter of a beam spot to read information. In this case, an aberration occurring in the optical system, in particular a spherical aberration caused by a thickness error of a protecting layer of the recoding medium greatly affects the image forming spot diameter. This aberration must be detected and corrected by some methods.

For this background, many aberration detecting methods have been proposed. JP-A-1998-214436 and JP-A-2000-57616 disclose the following technique. Light receiving elements are provided at a focal point. The light receiving elements are located at the inner and outer positions with respect to an optical axis of the beam. The light receiving areas of the inner and outer positions are each quartered by crossed division lines. By computing the output signals from those divided areas, a focal error signal and a spherical aberration signal are obtained. JP-A-2000-171346, JP-A-2002-39915, and JP-A-2002-55024 disclose another type of technique. Light receiving elements are provided at a point where light images. An incoming light beam is split into an inner light beam and an outer light beam. Those light beams are led to the light receiving elements, respectively. By computing the output signals from those divided areas, a focal error signal and a spherical aberration signal are obtained.

FIG. 1 is a diagram showing a light receiving device in use for the conventional aberration amount detecting mentioned above. A light source 103 generates laser light. Laser light emitted from the light source 103 travels through a predetermined path and reaches an optical disc (not shown). The lights reflected on the reflecting surface of the optical disc passes through a collimator lens 104. The reflected lights are incident on the areas of a hologram 101 and diffracted every reflected light, and image at predetermined positions on a light receiving element 102.

The reflected light that is incident on an inner peripheral area 101a of the hologram 101, images on a division line (not shown) provided on an inner peripheral light-amount detecting area 102a of the light receiving element 102. The reflected light incident on the outer peripheral area 101b of the hologram 101 images a division line (not shown) provided on an outer peripheral light-amount detecting area 102b of the light receiving element 102. The reflected lights that are incident on tracking error signal areas 101c and 101d image on tracking error signal detecting areas 102c and 102d, respectively. Paths of the reflected lights from the tracking error signal areas 101c and 101d to the tracking error signal detecting areas 102c and 102d, are not illustrated.

Already described, the inner and outer peripheral light-amount detecting area 102a and 102b are each divided into two sub areas by a division line. An amount of spherical aberration of the reflected light is computed according to the amounts of light from the two sub-areas and by using all the electric signals derived from the sub areas.

The aberration amount detecting device using the conventional light receiving device uses light in the vicinity of the image forming position to detect the aberration amount. For this reason, in a state that the aberration amount is almost zero, the reflected light must almost image at each light receiving area. The light receiving areas provided at least for detecting the aberration amount are each divided. It is necessary to position a microspot of which the diameter ranges from several μm to over ten μm on the division line at each light receiving area. Where each light receiving area is quartered by crossed division lines, it is necessary to position the center of the microspot at a nodal point of the crossed division lines.

Accordingly, it is difficult to set a positional relation between the hologram 101 and the light receiving areas of the light receiving element 102. In a case where the light receiving areas of the light receiving element 102 are integrally formed as shown, it is necessary to exactly set the orientations of the light receiving element as well as the position relation. This is very difficult to realize such by the manufacturing.

Since the spot diameter is extremely small, it is difficult to split the light containing the center of light from the peripheral light not containing the same, and apply those split lights to different light receiving areas. Even if the light is split into two different lights, and those split lights are successively received by the two light receiving areas, the number of divisions is at most two. Accordingly, many restrictions are imparted to the formulae for computing the aberration amount and the focus correction amount.

When device temperature varies, the frequency of the laser light slightly shifts from its correct value, a direction in which the laser light is diffracted by the hologram slightly changes, and hence the laser light lands at a position slightly different from the division line.

Also when the laser light used for the optical pickup used in the aberration amount detecting device is slightly shifted in the radial direction of the optical disc by the tracking servo, the laser light also lands at a position out of the division line.

SUMMARY OF THE INVENTION

Accordingly, an object of the present invention is to provide a light receiving device, a light detecting device, and an optical signal reproducing device which are easy to manufacture, and operable free from a shift of an focal point of light caused by ambient temperature variation.

A light receiving device having a first light receiving element for receiving condensed light before the condensed light images, and a second light receiving element for receiving the condensed light after the condensed light images. The first and second light receiving elements are disposed at positions equidistantly spaced from an focal point of the condensed light and generate electrical signals based on light received by the light receiving elements. In the light receiving device, each of the fist and second light receiving elements includes: a first light receiving area for receiving light of a central part of the condensed light; a second light receiving area adjoining a side of the first light receiving area and for receiving light not containing the light of the central part of the condensed light; and a third light receiving area adjoining a side of the second light receiving area which is opposite to the first light receiving area.

Thus, the unique feature that the light receiving elements are not located at positions near the focal point of the received light, lessens the requirements for the positional precision of the light receiving elements. With the first light receiving area for receiving light of a central part of the condensed light, the second light receiving area for receiving light not containing the light of the central part of the condensed light, and the third light receiving area for receiving light of a fringe part of the condensed light, the weak light of a fringe part of the image can be effectively utilized. Accordingly, in detecting the aberration amount and the focus correction amount, many different computations can be performed according to conditions by utilizing the output signals output from the light receiving areas of both the light receiving elements. In the specification, the term "adjoin" means that the adjacent light receiving areas are disposed in contact with each other, and also that those light receiving areas are located adjacent to each other while being spaced from each other by a distance necessary for separating the light receiving areas one from the other.

In a preferred embodiment, a light receiving device according to claim 1, wherein the first light receiving element and the second light receiving element are symmetrical with respect to a point located between the first and second light receiving elements. Therefore, images of the condensed light before and after the light images are point symmetrical to each other. Therefore, the light receiving elements located on both sides of the focal point are able to receive light under almost the same conditions.

In the light receiving device, the width of the first light receiving area is preferably larger than that of the second light receiving area. By so selected, there is no chance that the optical axis shifts to an end of the first light receiving area, not a boundary between the first and second light receiving areas. This increases margins for error of mounting positions of the light receiving elements and the shift of the optical axis caused by ambient temperature of the device including the light receiving device.

In the light receiving device, the width of the third light receiving area is preferably larger than the width of each of the first and second light receiving areas. By so selected, the third light receiving area is able to receive even the weak light part around the fringe of the image, and hence, capable of producing an output signal of high level.

In the light receiving device, the total width of the widths of the first and second light receiving areas is preferably 20 to 50 μm. Further, it is preferable the widths of the first and second light receiving areas are each 10 to 30 μm. The width of the third light receiving area in a direction vertical to a boundary line between the second and third light receiving areas is preferably 40 to 180 μm.

In the light receiving device, the first and second light receiving elements are located at positions spaced apart from the focal point of the light by a distance of 0.1 to 0.5 mm. With such an arrangement, images are obtained at the first to third light receiving areas, and a sufficiently large output signal is produced.

In the light receiving device, the first light receiving element receives one of lights spectrally split by a splitting means, and the second light receiving element receives the other split light. By so spectrally splitting light, it is easy to receive the lights before and after the light images. The splitting means may be any of a half prism, a parallel plane element, and a hologram.

In the light receiving device, when the splitting means is a hologram, a boundary line between the first and second light receiving areas and a boundary line between the second and third light receiving areas are substantially vertical to the parallel lines of a grating of the hologram. When a wavelength of laser light passing through the hologram deviates from its correct value, a diffraction angle of the laser light changes in a direction vertical to the parallel lines of the grating of the hologram. In such an arrangement, the respective light receiving areas receive fixed amounts of light also when the wavelength of the received laser light changes owing to ambient temperature of the related device. Sometimes one or some of the parallel lines of the grating are slightly bent. In the specification, "substantially vertical to the parallel lines of the grating" means that the boundary lines are substantially vertical to an average of the directions of the lines of the grating containing the slightly bent parallel grating line.

Where each light receiving element receives light the light reflected from the optical recording medium when the optical recording medium is irradiated with light, the light receiving device is suitable in use for, for example, a pickup device of the optical disc. In the light receiving device, a boundary line between the first and second light receiving areas and a boundary line between the second and third light receiving areas are substantially vertical to a direction of a component of the reflected light in a track direction of the optical recording medium. This arrangement suppresses adverse effects which will be produced when the focus lens 39 shifts in a direction (radial direction) vertical to the track of the optical disc 2 by the follow-up action of the tracking-servo. Specifically, if the track becomes eccentric and the objective lens shifts, the image of the reflected light sometimes shifts in a direction vertical to the track direction. Even in such case, substantially fixed images are received at the light receiving areas and stable output signals are secured.

In another embodiment, the light receiving device further comprises aberration correction means for correcting a quantity of aberration of the light reflected from the optical recording medium when the optical recording medium is irradiated with light in accordance with an aberration correction drive current based on the output signals of the first and second light receiving elements.

According to another aspect of the invention, there is provided a light detecting device includes an aberration amount detecting circuit for detecting an aberration amount by using the output signals of the first and second light receiving elements of any of the light receiving devices described above. When the reflected light contains a spherical aberration caused by manufacturing error of the optical disc, the light detecting device having such an aberration amount detecting circuit is capable of acquiring its information satisfactorily.

In the light detecting device, the aberration amount is detected by using any of the following equations:

$$AB = a_+ - a_-$$

$$AB = (a_+ + b_-) - (b_+ + a_-),$$

$$AB = (a_+ + b_- + c_-) - (a_- + b_+ + c_+),$$

$$AB=(a_++b_++c_-)-(a_-+b_-+c_+),$$

$$AB=(a_++b_-+c_+)-(a_-+b_++c_-),$$

$$AB=(a_++b_+)-(a_-+b_-)$$

where $a_+$, $b_+$, and $c_+$ are output signals derived from the first to third light receiving areas of the first light receiving element, $a_-$, $b_-$, and $c_-$ are output signals derived from the first to third light receiving areas of the second light receiving element. By using such equations, if $AB=a_+-a_-$, $AB=(a_++b_-)-(b_++a_-)$, or $AB=(a_++b_-+c_-)-(a_-+b_++c_+)$, a sensitivity of sensing the aberration amount is high. If $AB=(a_++b_+)-(a_-+b_-)$ or $AB=(a_++b_-+c_-)-(a_-+b_++c_+)$, a margin for the optical axis shift is large. If $AB=(a_++b_++c_-)-(a_-+b_-+c_+)$, the sensitivity of sensing the aberration amount is further increased.

The light detecting device may include a focus correction amount detecting circuit for detecting a focus correction amount by using the output signals of the first and second light receiving elements of any of the light receiving devices described above. The light detecting device thus constructed is capable of properly detecting a focus correction amount.

In the light detecting device, the focus correction amount FO is detected by using any of the following equations:

$$FO=a_++a_-$$

$$FO=(a_++b_-)-(b_++a_-),$$

$$FO=(a_++b_-+c_-)-(a_-+b_++c_+),$$

$$FO=(a_++b_++c_-)-(a_-+b_-+c_+),$$

$$FO=(a_++b_-+c_+)-(a_-+b_++c_-),$$

$$FO=(a_++b_+)-(a_-+b_-)$$

where $a_+$, $b_+$, $c_+$ are output signals derived from the first to third light receiving areas of the first light receiving element, $a_-$, $b_-$, and $c_-$ are output signals derived from the first to third light receiving areas of the second light receiving element. Thus, the focus correction amount and the aberration correction amount are computed independently. Therefore, there is no interference between the correction signals. Any particular limitation is not imparted to choice of the detection formulae. Those formulae may be appropriately chosen while considering its balance with the aberration correction signal.

An optical signal reproducing device constructed according to the invention receives light the light reflected from an optical recording medium when the optical recording medium is irradiated with light, and reproduces a signal from the optical recording medium, by using the optical signal reproducing device includes the light detecting device described above.

BRIEF DESCRIPTION OF THE DRAWINGS

FIG. 16 is a graph showing variations of signals with respect to thickness errors of a protecting film which are computed by use of a plurality of computing formulae when a distance between an focal point and a light receiving element is 0.162 mm.

FIG. 17 is a graph showing variations of signals with respect to thickness errors of a protecting film which are computed by use of a plurality of computing formulae when a distance between an focal point and a light receiving element is 0.243 mm.

DESCRIPTION OF THE PREFERRED EMBODIMENTS

The preferred embodiments of the present invention will be described with reference to the accompanying drawings. Diagrams to be used for explanation are depicted in model form by modifying the scales for simplicity purposes. It should be understood that such depiction of diagrams does not affect the technical idea of the invention in any way. The present invention will be described by using an optical signal reproducing device in which blue laser light of 405 nm in wavelength is used and a numerical aperture for the light receiving element side is 0.1.

Figure 1:
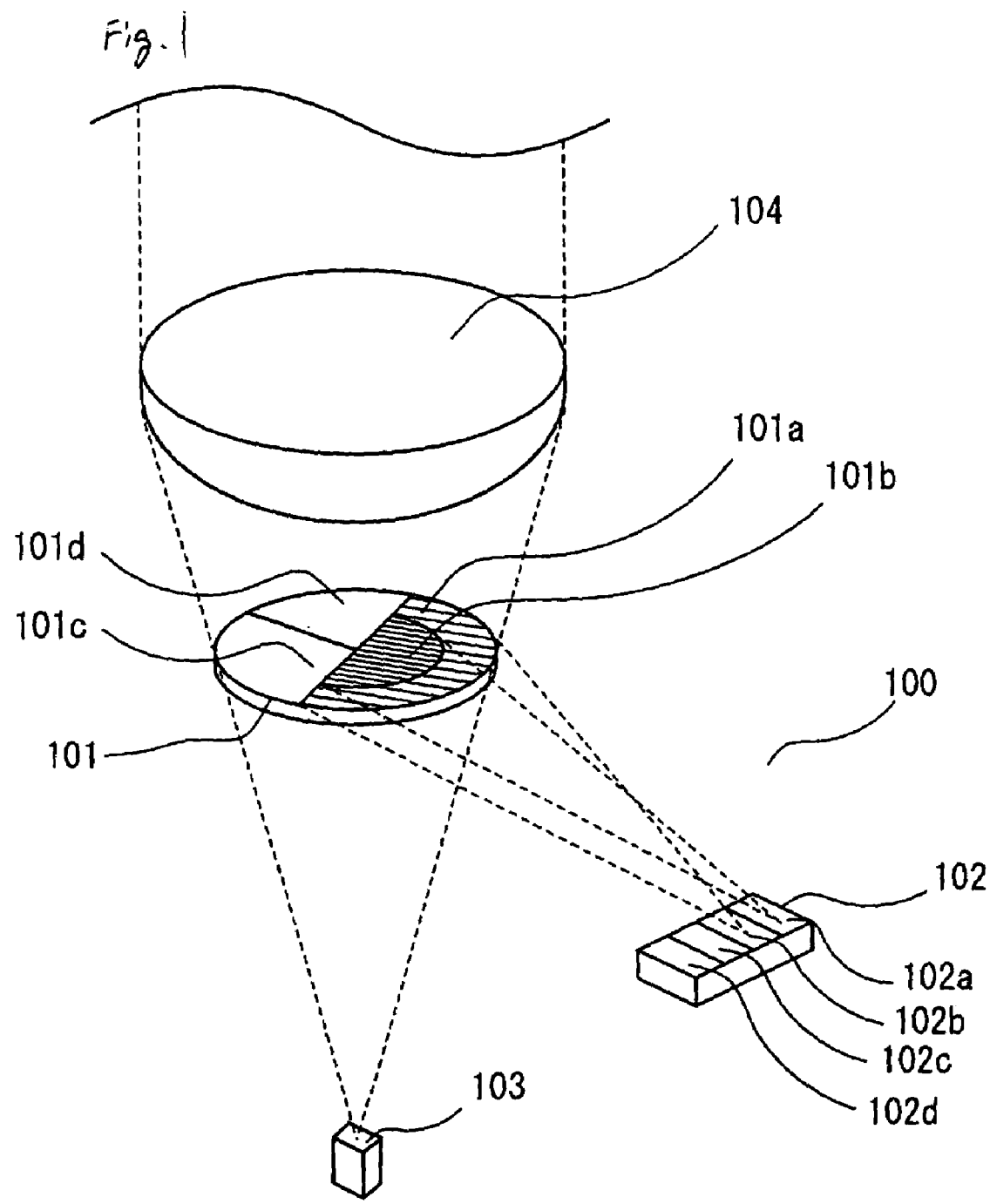
FIG. 1 is a diagram showing a light receiving device in use for a conventional aberration amount detecting device.
Figure 2:
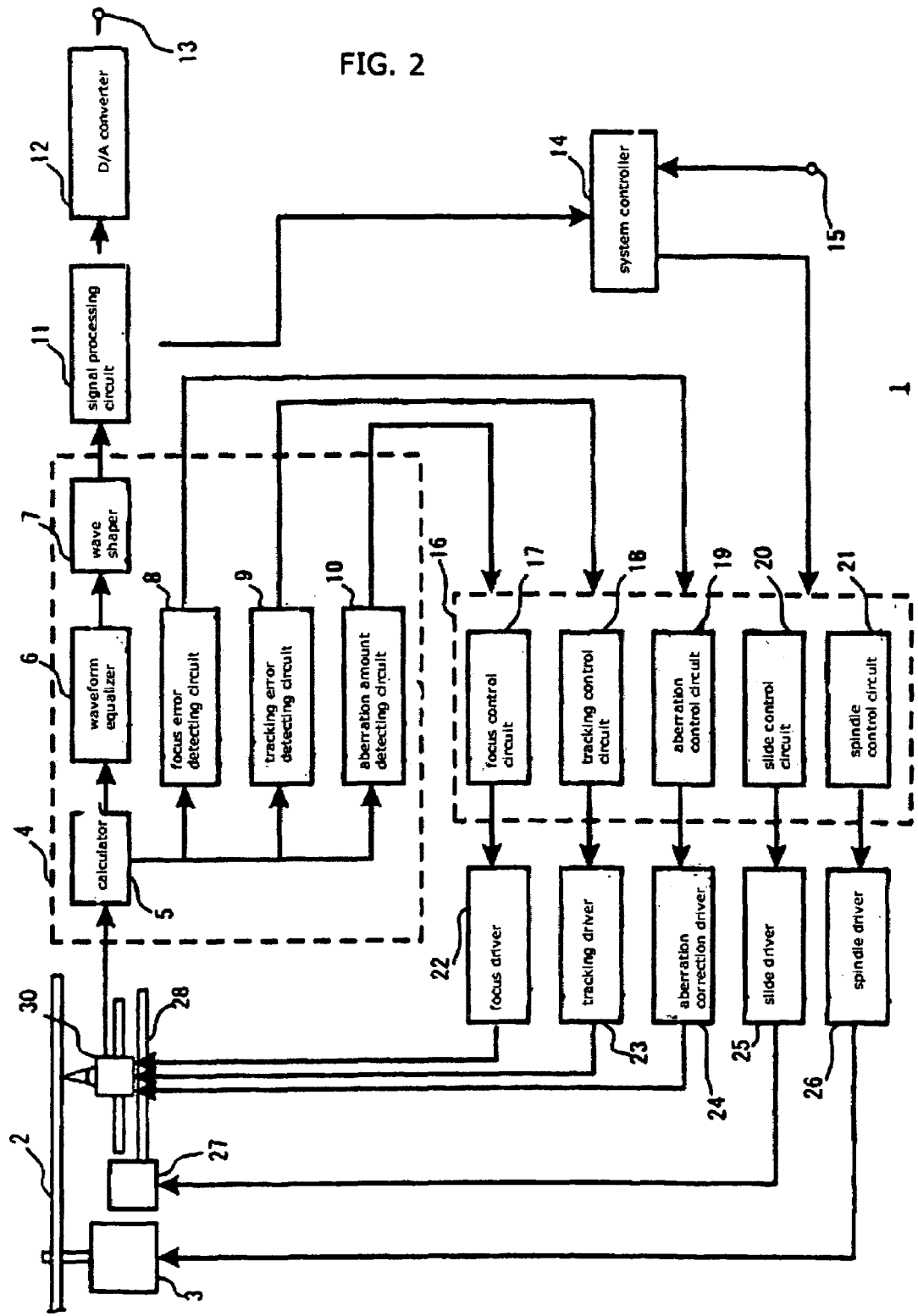
FIG. 2 is a block diagram showing an optical disc reproducing device which is one form of an optical signal reproducing device constructed according to the invention.

FIG. 2 is a block diagram showing an optical disc reproducing device 1 which is one form of an optical signal reproducing device. The optical disc reproducing device 1 functions to reproduce information recorded on an optical disc 2, which is directly or indirectly chucked on a spindle motor 3 by means of a chucking means (not shown)

The optical pickup 30 is a light receiving device for reading out information from the optical disc and outputting an electrical signal indicative of the readout information. The optical pickup is provided on a chassis 28, and may be moved in a radial direction of the optical disc 2 by a slide motor 27.

An electrical signal output from the optical pickup 30 is input to an RF amplifier 4 which produces an RF signal as data reproducing signal, a focus error signal, a tracking error signal, and an aberration amount signal. In the RF amplifier 4, electrical signals from the optical pickup 30 are input to the calculator 5. The calculator 5 adds together all electrical signals from the photo diodes as light receiving elements (to be described later) to thereby produce an RF signal. The RF signal is input to a waveform equalizer 6 which in turn waveform equalizes the RF signal to suppress the waveform interference and the like. A signal output from the waveform equalizer 6 is input to a wave shaper 7 where it is converted into a pulse signal. The pulse signal is input to a signal processing circuit 11. The signal processing circuit 11 executes the processings of clock reproduction, sync detection, data demodulation, error detection, error correction and others. A signal output from the signal processing circuit 11 is applied to a D/A converter 12. In turn, the D/A converter 12 converts the received signal into an analog signal, and outputs the analog signal through an output terminal 13.

In the RF amplifier 4, electric signals output from the photo diodes as light receiving elements, in addition to data output signals, are input to a focus error detecting circuit 8, a tracking error detecting circuit 9, and an aberration detecting circuit 10. Those circuit blocks execute computing processings to produce a focus error signal, a tracking error signal, and an aberration signal, respectively, and output those signals to a servo processing circuit 16.

The servo processing circuit 16 includes a focus control circuit 17, a tracking control circuit 18, a aberration control circuit 19, and a slide control circuit 20. The servo processing circuit 16 receives the focus error signal, the tracking error signal, the aberration amount signal and the like from the RF amplifier 4, and generates signals for adjusting the focusing, tracking, and aberration of the optical pickup 30 and for slide adjusting a position of the optical pickup 30, and sends those servo signals to a focus driver 22, a tracking driver 23, an aberration correction driver 24, and a slide driver 25. The servo processing circuit 16 further includes a spindle control circuit 21 which sends a spindle servo signal to a spindle driver 26.

Upon receipt of the servo signal from the servo processing circuit 16, the tracking driver 23 generates a tracking drive current to drive tracking means in the optical pickup 30 and a tracking correction operation is performed, as will be described later. Upon receipt of the servo signal from the servo processing circuit 16, the focus driver 22 generates a focus drive current for moving a focus lens of the optical pickup 30 in focusing direction. Upon receipt of the servo signal from the servo processing circuit 16, the aberration correction driver 24 generates an aberration correction drive current for driving aberration correcting means (to be described later) in the optical pickup 30 and an aberration correction operation is performed based on the current signal.

Further, the slide driver 25 generates a current for sliding the optical pickup 30 by the slide motor 27 in accordance with a slide servo signal. The spindle driver 26 generates a current for controlling rotation of a spindle motor 3 in accordance with a spindle servo signal.

A system controller 14 receives signals from an external switch 15 and the signal processing circuit 11, and sends a control signal to the servo processing circuit 16 and others.

The optical signal reproducing device has been described by use of the optical signal reproducing device. Further, the optical signal reproducing device may be realized in the form of a recording/reproducing device which is capable of recording optical signals. In this case, a predetermined circuit must be additionally used. It will be readily understood that the optical signal reproducing device is realized in any of other suitable forms.

Figure 3:
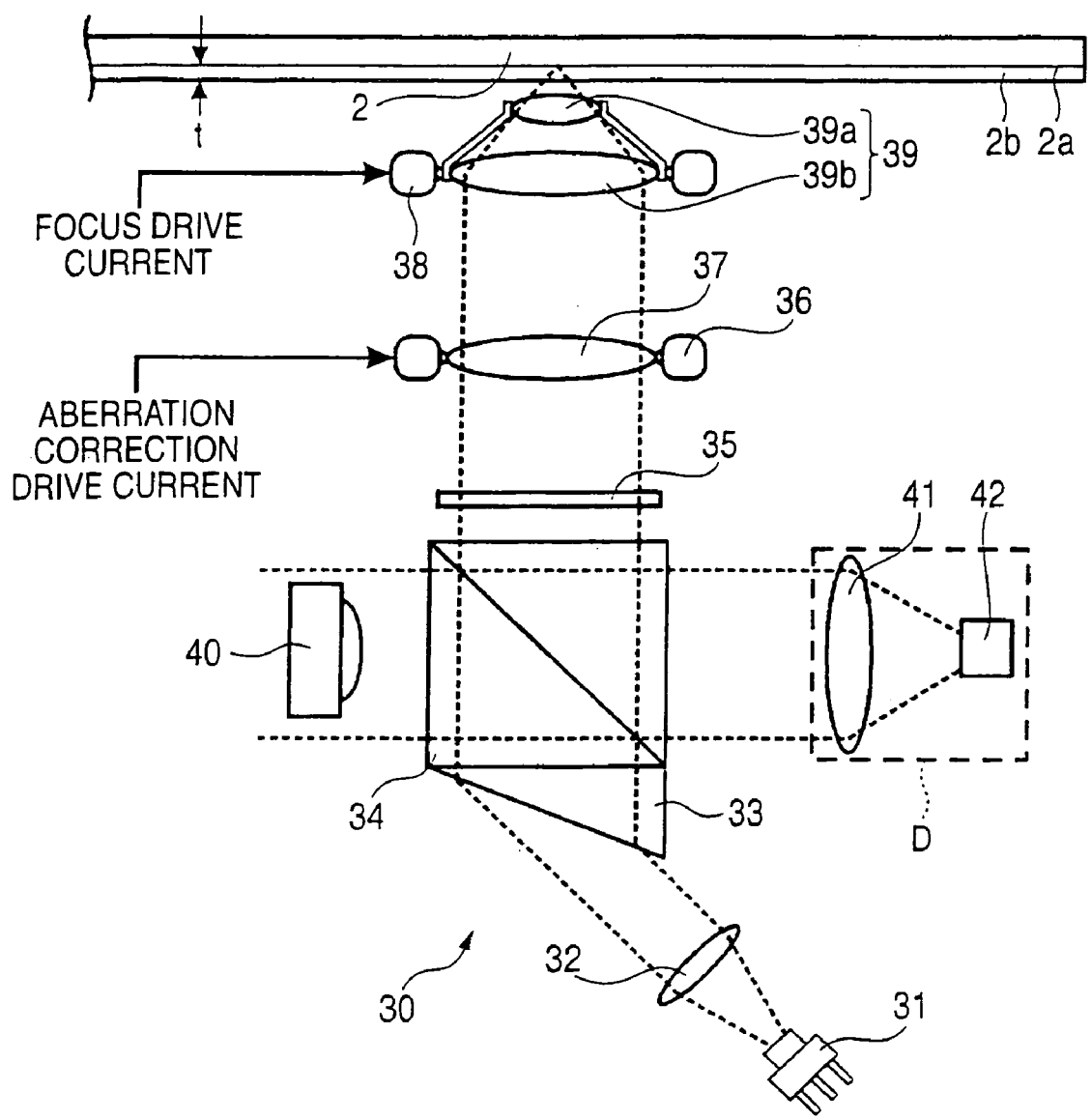
FIG. 3 is a model diagram showing an optical system of an optical pickup as one form of an optical signal detecting device constructed according to the invention.

FIG. 3 is a model diagram showing an optical system of an optical pickup as one form of an optical signal detecting device constructed according to the invention. The optical pickup to be discussed below is operable for both information reproducing and recording purposes.

The semiconductor laser device 31 as a light source generates blue laser light whose wavelength is 405 nm. The laser light emitted from the semiconductor laser device 31 is diverged to an appropriate extent, and then it is collimated by a collimator lens 32. The laser light is generated in a state that it is elliptical in cross section or as viewed in a plane perpendicular to the light traveling direction. To reshape the laser light, the laser light is caused to enter a beam forming prism 33. The beam forming prism 33 reshapes the laser light by its refraction, so that the laser light takes a substantially complete round in cross section. Immediately after emitted from the semiconductor laser device 31, the laser light is inclined at a predetermined angle to the optical disc 2. After passing through the beam forming prism 33, the laser light is refracted to a direction perpendicular to the optical disc 2.

To reproduce an information signal from the optical disc 2, the semiconductor laser device 31 emits laser light of a fixed output power. To record information into the optical disc 2, an intensity of the laser light emitted varies in accordance with a signal to be recorded. In the invention, a wavelength of the laser light emitted from the semiconductor laser device 31 differs in accordance with the different standards employed, and is not limited to a specific wavelength.

After passing through the beam forming prism 33, the laser light enters a polarized light beam splitter 34 as a sort of half prism. About 10% of the laser light emitted from the semiconductor laser device is reflected toward a power-monitor photo diode 40 by the polarized light beam splitter 34, while the remaining laser light, i.e., about 90% of the emitted laser light, is used for reading out information from the optical disc. The power-monitor photo diode 40 monitors an intensity of the laser light emitted from the semiconductor laser device 31, and feeds back the result of the monitoring to the semiconductor laser device 31 through a circuit (not shown) The monitoring function by the power-monitor photo diode 40 is not essential to the invention, but will work well in particular, when the optical pickup 30 is operated for recording purposes.

The laser light emitted from the polarized light beam splitter 34 passes through the ¼ wavelength plate 35. When passing through the ¼ wavelength plate 35, the laser light is circularly polarized, and the circularly polarized light flux is incident on the optical disc.

The laser light having passed through the ¼ wavelength plate enters the aberration correction lens 37. In some cases, the aberration correction lens consists of a single lens, and in other cases, the aberration correction lens consists of combination of plural lenses. Either of those types of aberration correction lenses may be used in the invention. The aberration correction lens 37 is held with an aberration correction actuator 36 containing, for example, a combination of a coil and a magnet as a part, whereby those components form aberration correction means. With the aberration correction means thus constructed, the aberration correction lens 37 is adjusted in an aberration correction direction in accordance with the aberration correction drive current already referred to.

The focus lens 39 is constructed such that a lens containing lens elements 39a and 39b is held with a focus actuator 38. With such a construction, the focus lens 39 is adjusted in a focusing direction in accordance with the focus drive current already mentioned to. By the focus lens 39, the laser light is condensed on the reflecting surface of the optical disc 2. Specifically, the laser light that is circularly polarized by the ¼ wavelength plate 35 is condensed by the focus lens 39 and incident on a reflecting surface 2a of the optical disc 2, through a protecting film 2b thereof.

The focus lens 39 may consist of a single lens or a combination of plural lenses as shown. Where the focus lens 39 is formed by the combination of two or more lenses, each lens is not required to have a large curvature in lens design even if a numerical aperture NA of the lens is selected to be large. This type of focus lens 39 is advantageous in that the manufacturing of the lenses is easy. Further, it is suitable for the case of increasing the recording density and the recording capacity.

The optical disc 2 has a full thickness of 1.2 mm, and in its structure, a reflecting surface 2a is formed over a substrate made of polycarbonate, for example. In the case of the optical disc used exclusively for reproduction, the signal is recorded in the reflecting surface 2a of the optical disc. Two types of reflecting surfaces are present. In a first type of reflecting surface, the signal is recorded in the form of the ruggedness of the reflecting surface. In a second type of reflecting surface, the signal is recorded in the form of a variation of a crystal state of the reflecting surface. In the case of the optical disc of the recording type, the signal can be recorded in the reflecting surface 2a by the user. This optical disc is classified into two types of optical discs, a rewritable optical disc and a non-rewritable optical disc. The protecting film 2b for protecting the reflecting surface 2a is also made of transparent resin, such as polycarbonate, and its thickness is about 0.1 mm. The term "optical signal" in the specification involves the signal recorded in the reflecting surface.

The laser light incident on the optical disc 2 is reflected on the reflecting surface 2a of the optical disc to be a return laser light. The return laser light travels through the optical path through which the laser light traveled toward the optical disc; It travels through the focus lens 39 and the aberration correction lens 37, and then reaches the ¼ wavelength plate 35. The return laser light passes through the ¼ wavelength plate 35 to be a linearly polarized light rotated by 90° from the polarization direction of the laser light when it is incident on the ¼ wavelength plate 35. Thereafter, the return laser light enters the polarized light beam splitter 34 and reaches the light receiving block D. If required, the polarized light beam splitter 34 may be substituted by, for example, a parallel plane element serving as a half mirror.

In the embodiment, the light receiving block D is made up of a cylindrical lens 41 and a light receiving part 42 including a light receiving device.

Figure 4:
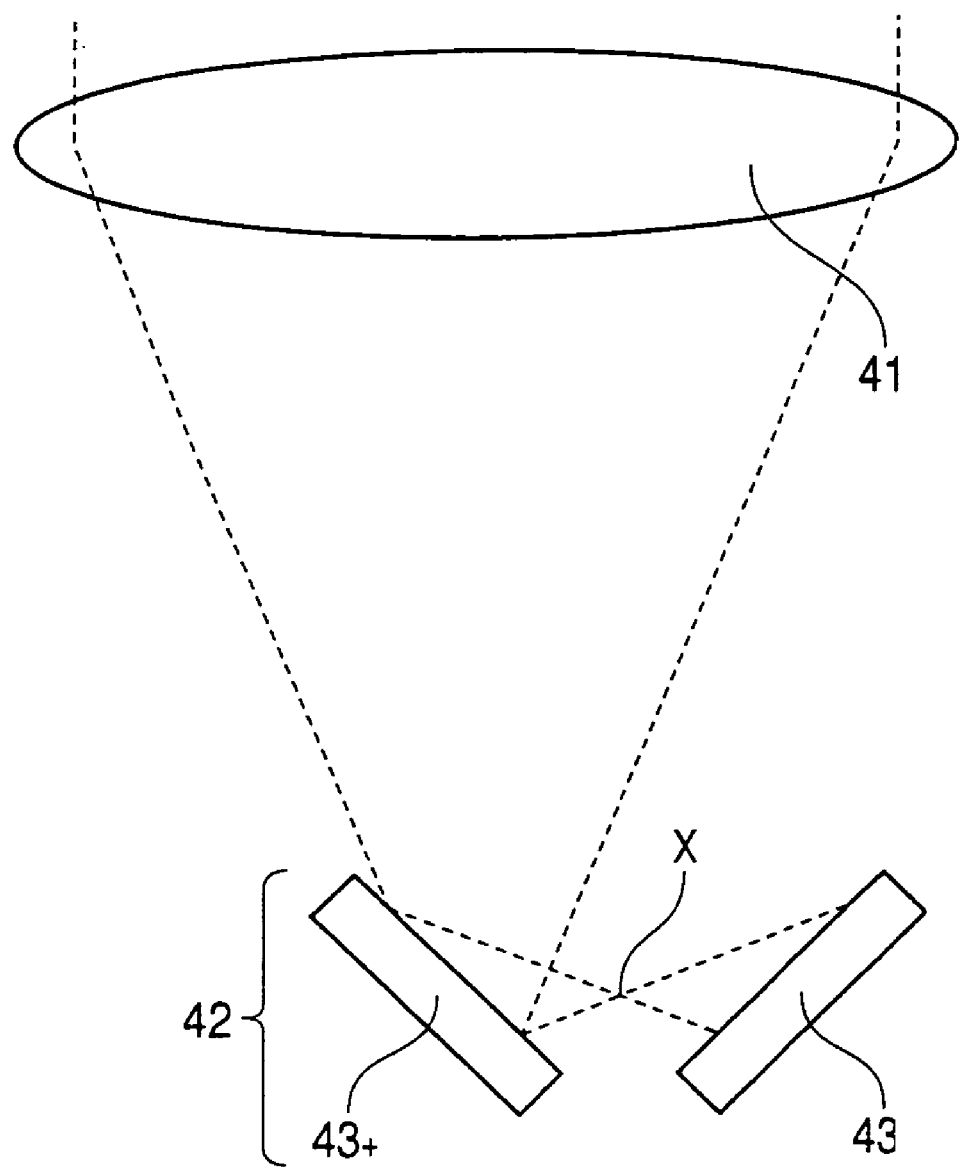
FIG. 4 is a diagram showing a specific example of a light receiving block shown in FIG. 3.

FIG. 4 is a diagram showing a specific example of the light receiving block D shown in FIG. 3. As shown, the light receiving block is made up of a cylindrical lens 41 and a light receiving part 42 as a light receiving device. The light receiving part 42 includes a first photo diode $43_+$ and a second photo diode $43_-$, which are respectively first and second light receiving elements.

The return laser light enters the cylindrical lens 41 in the form of parallel rays and is converged by the cylindrical lens 41. The first photo diode $43_*$ as a first light receiving element receives the converged laser light before it is imaged. Specifically, it gathers about 50% of the received laser light, and reflects the remaining laser light, i.e., about 50% of the received laser light. The reflected laser light images at an focal point X, and thereafter it diverges. The laser light then diverges and enters the second photo diode as a second light receiving element. The first and second photo diodes are spaced equidistantly from the focal point X. Accordingly, images that are formed on the first and second photo diodes $43_+$ and $43_-$ are symmetrical in shape with respect to a point. If the images are circular in shape, the diameters of the images are substantially equal to each other.

Figure 5:
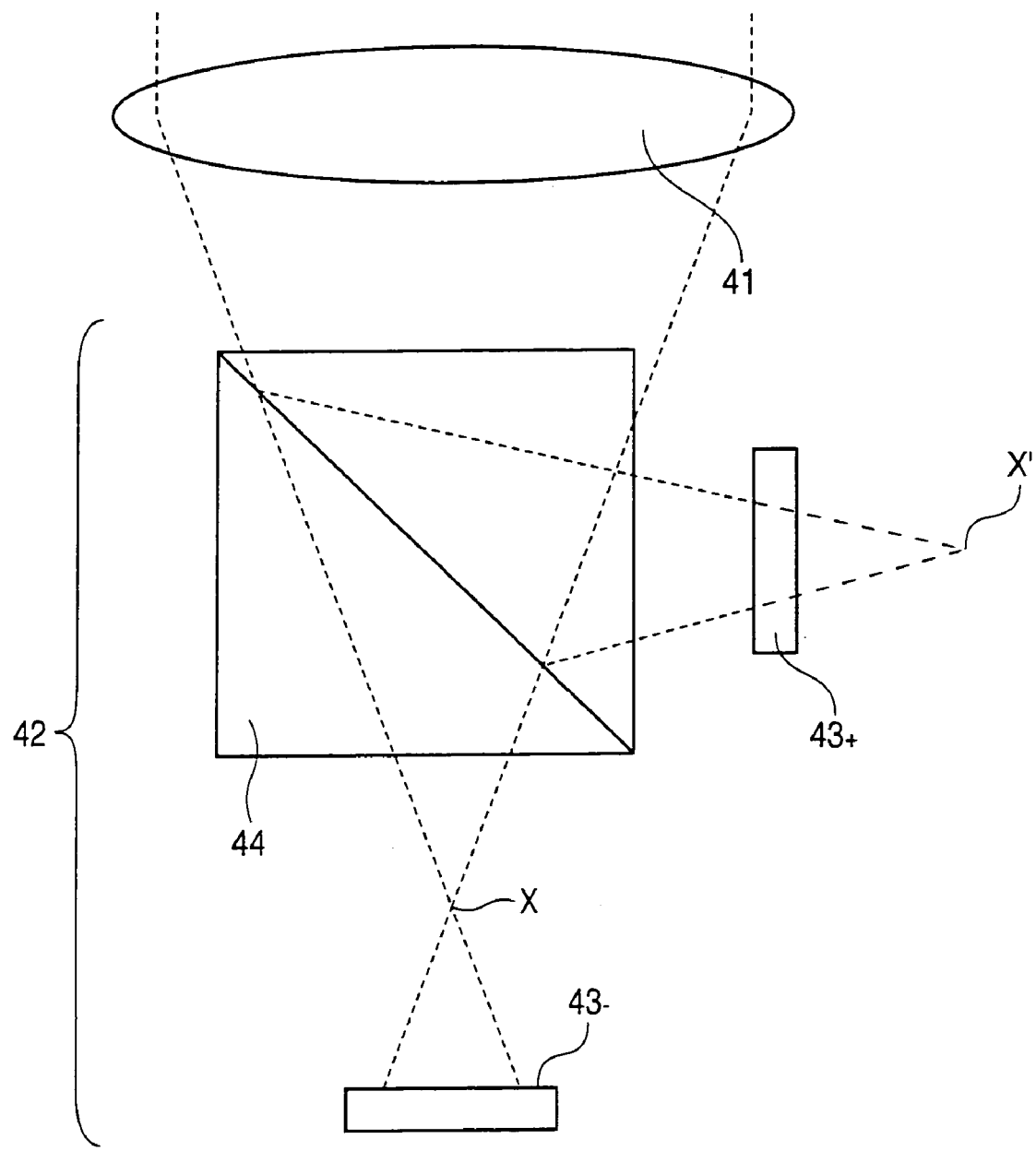
FIG. 5 is a diagram showing another specific example of the light receiving block D shown in FIG. 3.

FIG. 5 is a diagram showing another specific example of the light receiving block D shown in FIG. 3. Also in this embodiment, the light receiving block D of the instant example also is made up of a cylindrical lens 41 and a light receiving part 42. The light receiving part 42 includes a half-prism 44 and first and second photo diodes.

The return laser light enters the cylindrical lens 41 in the form of parallel rays and is converged by the cylindrical lens 41. The half-prism 44 permits about 50% of the received laser light to pass therethrough, and reflects the remaining laser light, i.e., about 50% of the received laser light. The reflected laser light is received by a first photo diode $43_+$ as a first light receiving element before it images. The laser light having passed through the half-prism 44 images at an focal point X, and thereafter it is received by a second photo diode $43_-$ as a second light receiving element. If required, the half-prism 44 may be substituted by a parallel plane element which permits about 50% of the received laser light to pass therethrough, and reflects the remaining laser light, i.e., about 50% of the received laser light.

In the figure, if the laser light that is reflected by the half-prism 44 pass through the first photo diode $43_+$, it will image at a point. Let this point be a virtual focal point X'. A distance between the focal point X' and the first photo diode $43_+$ is selected to be substantially equal to a distance between an focal point X and the photo diode $43_-$. Then, in this embodiment, a distance from the first photo diode to the focal point is equal to a distance from the second photo diode to the focal point. Therefore, in an ideal condition that no aberration is present, images that are formed on the first and second photo diodes $43_+$ and $43_-$ are symmetrical in shape with respect to a point. If the images are circular in shape, the diameters of the images are substantially equal to each other.

Each photo diode generally contains a light receiving part for converting received light into a corresponding electric signal, and a resin film covering the light receiving part. In the embodiments of FIGS. 5 and 4, and an embodiment to be described below, the wording "a distance from the first photo diode $43_+$ to the focal point is substantially equal to a distance from the second photo diode $43_-$ to the focal point.", involves that a distance from the light receiving part of the first photo diode to the focal point is substantially equal to a distance from the light receiving part of the second photo diode to the focal point. "To slightly shift the first photo diode and/or the second photo diode from the focal point in order to match an image of the laser light irradiated on the first photo diode to an image of the laser light irradiated on the second photo diode" is also involved in that wording in the embodiments of FIGS. 5 and 4, and the embodiment to be described below.

Figure 6:
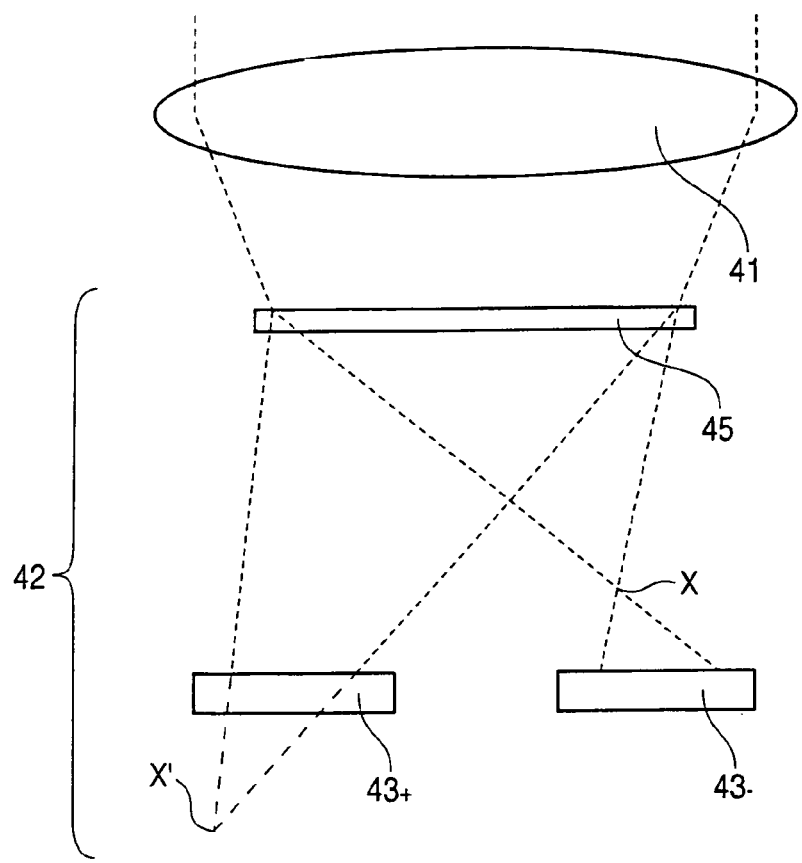
FIG. 6 is a diagram showing yet another specific example of the light receiving block shown in FIG. 3.

FIG. 6 is a diagram showing yet another specific example of the light receiving block D. In this embodiment, the light receiving block is made up of a cylindrical lens 41 and a light receiving part 42 as a light receiving device. The light receiving part 42 includes a hologram 45 and first and second photo diodes $43_+$ and $43_-$ as a set of light receiving elements. The laser light having passed through the cylindrical lens 41 passes through the hologram 45 by which it is spectrally split. One of the split laser lights is received by a first light receiving element $43_+$ before it mages. If the laser light pass through the first photo diode $43_+$, the laser light will image at a point. Let this point be a virtual focal point X'. A distance from an focal point X to the second light receiving element $43_-$ is selected to be substantially equal to a distance from the virtual focal point X' to a first focal point. Then, in this embodiment, as in the embodiment shown in FIG. 5, a distance from the first photo diode $43_+$ to the focal point is substantially equal to a distance from the second photo diode $43_-$ to the focal point.

Figure 7:
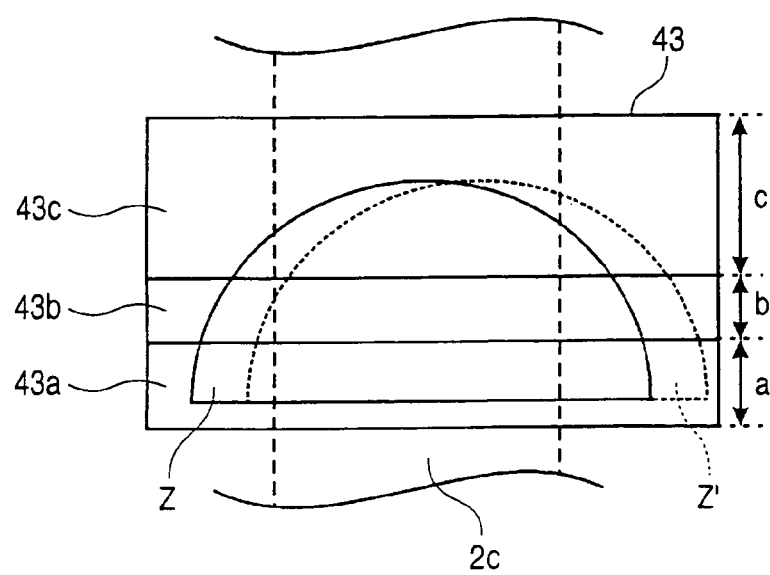
FIG. 7 is a diagram showing a light receiving area of a first or second photo diode.

FIG. 7 is a diagram showing a light receiving area of a first or second photo diode. The first and second photo diodes 43+ and $43_-$ are different only in location, and those photo diodes are equal in structure. Accordingly, the first and second photo diodes 43+ and $43_-$ are generally designated by reference numeral 43. Each photo diode 43 has a rectangular planar structure. The photo diode 43 contains three rectangular light receiving areas; a first light receiving area 43a, a second light receiving area 43b, and a third light receiving area 43c. Those light receiving areas 43a, 43b and 43c have widths "a", "b" and "c", respectively.

In the light receiving blocks shown in FIGS. 4 and 5, an image Z of the laser light reflected by the reflecting surface 2a of the optical disc 2 is circular in shape. In the instant embodiment, the diffraction grating is ruled so that only the half of the laser light that the hologram shown in FIG. 6, for example, receives is refracted toward the light receiving elements. Accordingly, the half of the laser light is received by the light receiving elements.

A central part Zc of an image Z of the laser light is formed on the first light receiving area 43a. The second light receiving area 43b does not receive the central part of the laser light; however, it can receive the laser light of relatively high intensity since it adjoins the first light receiving area 43a. The third light receiving area 43c receives a fringe part of the laser light. For this reason, the third light receiving area 43c is wider than the remaining light receiving areas. If the central part of the laser light is received at the end of the light receiving area, there is the possibility that the photo diode 43 fails to detect the central part of the laser light because of presence of minor manufacturing errors or the like. A width of the first light receiving area is selected to be larger than that of the second light receiving area so that the first light receiving area can sufficiently receive the central part of the laser light. The "width" of the light receiving area means a width of the light receiving area as viewed in the direction of a boundary line between the adjacent light receiving areas.

To cope with such a situation that each photo diode completely receives the laser light reflected by the reflecting surface 2a of the optical disc 2, and an image Z formed thereon is circular in shape, what a designer has to do is to design the photo diode such that the light receiving are such that second light receiving areas are located on both sides of a first light receiving area, and third light receiving areas are each located on the other side of the first light receiving area with respect to the related second light receiving area. That is, the photo diode is configured such that the first light receiving area is located between the second light receiving areas, and the sum of the first and second light receiving areas is located between the third light receiving areas.

In FIG. 7, reference numeral 2c indicates a track direction 2c of the optical disc 2. In the instant embodiment, the photo diode 43 is arranged such that the track-directional component of the laser light reflected by the reflecting surface 2a of the optical disc 2 is vertical to a boundary line between the first and second light receiving areas 43a and 43b, and a boundary line between the second and third light receiving areas 43b and 43c. The reason why the photo diode is so arranged is that it is necessary to suppress adverse effects which will be produced when the focus lens 39 shifts in a direction (radial direction) vertical to the track of the optical disc 2 by the follow-up action of the tracking-servo. Specifically, if the track becomes eccentric and the focus lens 39 shifts, the image Z of the reflected laser light shifts to an image Z' while moving in a direction vertical to the track direction 2c. Therefore, if the focus lens 39 shifts, a variation of the amount of light received by each light receiving area is minimized or reduced to zero since the photo diode 43 is arranged to be vertical to the boundary line between the adjacent light receiving areas. As a result, the output signal of each light receiving area is little affected.

Figure 8:
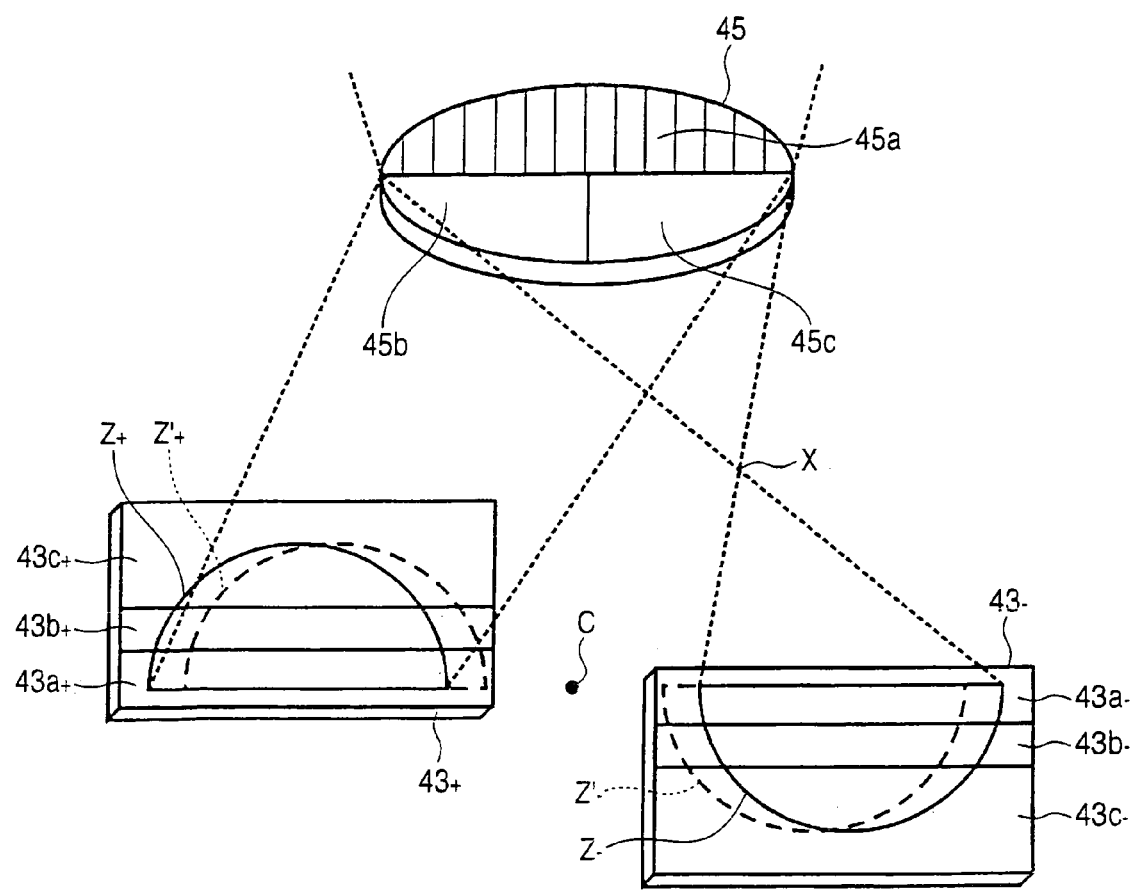
FIG. 8 is a diagram showing in detail the light receiving block shown in FIG. 6.

FIG. 8 is a diagram showing in detail the light receiving part 42 in the embodiment of FIG. 6. In FIG. 8, the hologram 45 is segmented into three light receiving areas 45a, 45b and 45c. For the hologram shown in FIG. 6, segmenting of the hologram as in the case of the FIG. 8 is not essential in the invention, however. The laser light diffracted at a semicircular area 45a of the hologram 45 is received by a first photo diode $43_+$ and a second photo diode $43_-$. A relation between an image $Z_+$ appearing on the first photo diode $43_+$ and an image $Z_-$ appearing on the second photo diode $43_-$ corresponds to a relation between the plus 1st-order light before the light images and the minus 1st-order light before the laser light images. Therefore, those images are shaped to be symmetrical in shape with respect to a point. Therefore, the first photo diode $43_+$ and the second photo diode $43_-$ are arranged to be symmetrical with respect to a point located between those photo diodes as a point. The word "point-symmetrical" means that the two photo diodes are arranged to be symmetrical with respect to a point when viewed from above. A step in the light incident direction or the like caused when the photo diodes receive the plus and minus 1st-order lights from the focal point at equal distances, is considered to be within an error.

Each photo diode is arranged such that a boundary line between the first light receiving area $43a_+$ ($43a_-$) and the second light receiving area $43b_+$ ($43b_-$) and a boundary line between the second light receiving area $43b_+$ ($43b_-$) and the third light receiving area $43c_+$ ($43c_-$) are substantially vertical to a direction of the diffraction grating of the semicircular area 45a of the hologram 45. The reason why those diodes are so arranged is that it is necessary to suppress adverse effects which will be produced when the wavelength of the laser light varies by temperature variation of the related device. Specifically, when the wavelength of the laser light varies by the temperature variation or the like, an angle at which the laser light is diffracted by the hologram 45 changes. By this angle change, images $Z_+$ and $Z_-$ appearing on the first and second photo diodes shift in a direction substantially vertical to the grating to be images $Z'_+$ and $Z'_-$ as indicated by dotted lines, respectively. By arranging the photo diodes $43_+$ and $43_-$ such that the boundary lines each between the adjacent light receiving areas are vertical to the direction of the grating of the semi-circular area of the hologram, the adverse effect by the wavelength variation of the laser light owing to the temperature variation is lessened. Sometimes one or some of the parallel lines of the grating are slightly bent. In the specification, such slight bending of the lines of the grating is neglected, and an average of the directions of the lines of the grating is used for the direction of the lines of the grating.

Also in the instant embodiment, it is preferable that each of the first and second photo diodes $43_+$ and $43_-$ is arranged such that, as shown in FIG. 7, a track directional component of the laser light reflected by the optical disc 2 is vertical in orientation to a boundary line between the first light receiving area $43a_+$ ($43a_-$) and the second light receiving area $43b_+$ ($43b_-$) and a boundary line between the second light receiving area $43b_+$ ($43b_-$) and the third light receiving area $43c_+$ ($43c_-$).

Figure 9:
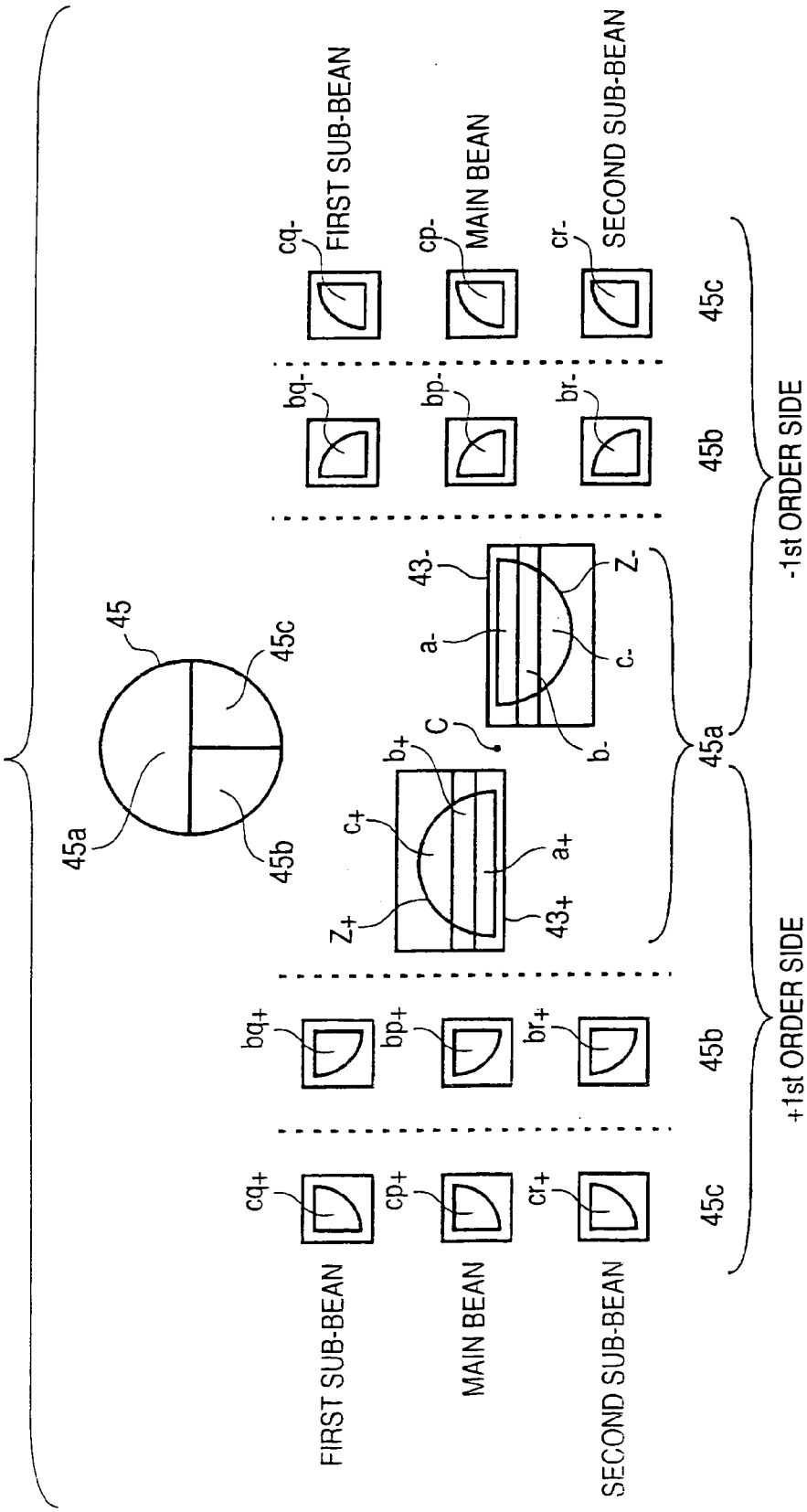
FIG. 9 is a diagram showing in model form preconditions for the computation of an aberration amount and the like by using a hologram consisting of three segmental areas, which is described referring to FIG. 8.

FIG. 9 is a diagram showing in model form preconditions for the computation of an aberration amount and the like by using a hologram consisting of three segmental areas, which is described referring to FIG. 8. In the illustrated case, three beams of different frequencies, a main beam, a first sub-beam and a second sub-beam, are used for the laser light. Further, there are illustrated images formed on the photo diodes by the laser light diffracted by three light receiving areas 45a, 45b and 45c of the hologram 45.

The plus 1st-order light of the main beam diffracted by the semi-circular area 45a is received by the first photo diode $43_+$, and the minus 1st-order light of the main beam is received by the second photo diode $43_-$. In an image $Z_+$ received by the first aph $43_+$, a segmental image $a_+$ is formed by the laser light received by the first light receiving area $43a_+$, a segmental image $b_+$ is formed by the laser light received by the second light receiving area $43b_+$, and a segmental image $c_+$ is formed by the laser light received by the third light receiving area $43c_+$. Of an image $Z_-$ received by the second photo diode $43_-$, a segmental image $a_-$ is formed by the laser light received by the first light receiving area $43a_-$, a segmental image $b_-$ is formed by the laser light received by the second light receiving area $43b_-$, and a segmental image $c_-$ is formed by the laser light received by the third light receiving area $43c_-$.

The main beam, the first sub-beam, and the second sub-beam are arrayed at a spatial interval of 120 μm in the embodiment. Accordingly, when the laser light reaches the light receiving elements $43_+$ and $43_-$, the main beam, the first sub-beam and the second sub-beam are spaced apart from one another by a distance of 120 μm. Design must be made such that neither of those photo diodes receives the first sub-beam and the second sub-beam that are diffracted by the area 45a. Therefore, the width of each of the light receiving elements $43_+$ and $43_-$ is selected to be 120 μm, preferably 100 μm.

The laser light diffracted at the area 45b is received by other related diodes, which are different from the first and second light receiving elements $43_+$ and $43_-$. The main beam is diffracted and split by the area 45b, and one of the split beams is received as the plus 1st-order light by one of the photo diodes before it images, and the other is received as the minus 1st-order light by the other photo diode after it images. The same thing is correspondingly applied to the first and second sub-beams spectrally split by the area 45c. One of the split first sub-beams is received as the plus 1st-order light by one of the related photo diodes before it images, and the other is received as the minus 1st-order light by the other diode after it images. One of the split second sub-beams is received as the plus 1st-order light by one of the related photo diodes before it images, and the other is received as the minus 1st-order light by the other diode after it images.

Under such conditions, images of the plus 1st-order laser lights of the main beam, and the first and second sub-beams that are diffracted at the area 45b successively become images $bp_+$, $bq_+$, and $br_+$ on the photo diode, as shown. The minus laser lights of those beams successively form images $bp_-$, $bq_-$, and $br_-$ on the diode.

Similarly, the laser light that is diffracted by the area 45c is also received by other diodes which are different from the first and second photo diodes $43_+$ and $43_-$ and also different from the diodes for receiving the laser light diffracted by the area 45b. In this case, the main beam is diffracted and split by the area 45c, and one of the split beams is received as the plus 1st-order light by one of the related photo diodes before it images, and the other is received as the minus 1st-order light by the other photo diode after it images. The same thing is correspondingly applied to the first and second sub-beams spectrally split by the area 45c. One of the split first sub-beams is received as the plus 1st-order light by one of the related photo diodes before it mages, and the other is received as the minus 1st-order light by the other diode after it images. One of the split second sub-beams is received as the plus 1st-order light by one of the related photo diodes before it images, and the other is received as the minus 1st-order light by the other photo diode after it images.

Under such conditions, images of the plus 1st-order laser lights of the main beam, and the first and second sub-beams that are diffracted at the area 45c successively become images $cp_+$, $cq_+$, and $cr_+$ on the photo diode, as shown. The minus laser lights of those beams successively form images $cp_-$, $cq_-$, and $cr_-$ on the diode.

In combinations of the images $bp_+$, $bq_+$, and $br_+$ and the images $bp_-$, $bq_-$, and $br_-$, and the images $cp_+$, $cq_+$, and $cr_+$ and the images $cp_-$, $cq_-$, and $cr_-$, a distance from a virtual focal point at which the plus 1st-order light images if it pass through the photo diode to the photo diode is selected to be substantially equal to a distance from an focal point of the minus 1st-order light to the photo diode. Therefore, in each combination, under an ideal condition that no aberration is present, those images are symmetrical in shape with each other.

In the instant embodiment, the laser lights spectrally split by the areas 45b and 45c are also received by the photo diodes before and after the laser lights image, for ease of understanding. The areas 45b and 45c are provided for detecting a tracking error signal. Therefore, there is no need of receiving the plus and minus 1st-order laser lights before and after the laser lights image. Accordingly, design may be made so as to avoid the deterioration of the photo diodes by heating at the focal points and to avoid the overlapping of the main beam with the sub-beams on the light receiving elements Methods for computing an aberration amount, a focus error quantity and the like by using the output signals of the photo diodes shown in FIG. 9, will be described below. The symbols are used for indicating the images shown in FIG. 9 and the output signals from the photo diodes on which the images are formed. In FIG. 2, an electrical signal output from the optical pickup 30 is input to the focus error detecting circuit 8, the tracking error detecting circuit 9, and the aberration amount detecting circuit 10. Upon receipt of the signal, those circuits calculate a focus error signal, a tracking error signal, and an aberration amount signal.

The aberration amount detecting circuit 10 is capable of detecting an aberration amount AB by using only an output signal of the first photo diode $43_+$ and an output signal of the second $43_-$. Mathematically, $AB=a_+-a_-$. This equation for computing the aberration amount is very simple since what one has to do for obtaining the aberration amount AB, is to merely compute a difference between the output signal from the first area of the first photo diode $43_+$ and the output signal of the second photo diode $43_-$. Further, any of the following computing methods may be used:

$$AB=(a_++b_-)-(b_++a_-), \qquad 1)$$

$$AB=(a_++b_-+c_-)-(a_-+b_++c_+), \qquad 2)$$

$$AB=(a_++b_++c_-)-(a_-+b_-+c_+), \qquad 3)$$

$$AB=(a_++b_-+c_+)-(a_-+b_++c_-), \qquad 4)$$

$$AB=(a_++b_+)-(a_-+b_-) \qquad 5)$$

In the instant embodiment, the laser light received by the first and second photo diodes $43_+$ and $43_-$ is shaped to be semi-circular by use of the hologram 45 in order to correct the tracking error too. It is evident that the laser light being circular in cross section, which is formed by entirely using the laser light, maybe used for computing the aberration amount, the focus error and the like.

The focus error signal may be computed by using only the output signals of the photo diodes, viz., output signals from the first and second photo diodes $43_+$ an $43_-$. Mathematically, $FO=a_++a_-$. This equation, like the equation for computing the aberration correction amount, is very simple. And the aberration amount can be computed in a very simple manner. Other computing methods may be enumerated as in the case of computing the aberration correction amount.

$$FO=(a_++b_-)-(b_++a_-), \qquad 1)$$

$$FO=(a_++b_-+c_-)-(a_-+b_++c_+), \qquad 2)$$

$$FO=(a_++b_++c_-)-(a_-+b_-+c_+), \qquad 3)$$

$$FO=(a_++b_-+c_+)-(a_-+b_++c_-), \qquad 4)$$

$$FO=(a_++b_+)-(a_-+b_-) \qquad 5)$$

The tracking error signal can be computed by using the following equation $$tr=(bp_++bp_--cp_+-cp_-)-k(bq_++bq_-+br_--cq_+-cq_--cr_+-cr_-)$$

where "k" is constant. The tracking signal may also be computed by using the following equation $$tr=(bq_++bq_--cq_+-cq_-)-(br_++br_-+cr_++cr_-)$$

The sum of all the signals by the plus and minus 1st-order lights may be used for the signals output as data signals.

The focus error signal, the tracking error signal and the aberration amount signal, which are thus generated, are input to the servo processing circuit 16. In turn the servo processing circuit 16 outputs servo signals to the focus driver 22, the tracking driver 23, and the aberration correction driver 24 which in turn generate a focus drive current, a tracking drive current, and an aberration amount correction drive current. And, as shown in FIG. 3, the focus drive current drives the focus actuator 38 to adjust a position of the focus lens 39. The tracking is corrected by the tracking drive current. The aberration amount correction drive current drives the aberration correction actuator 36 to adjust a position of the aberration correction lens.

In this way, the focus and tracking adjustments are performed, and the aberration is reduced. In another aberration reducing process, the aberration is corrected at once when or before a signal is read out of the optical disc 2, and subsequently no further aberration correction is performed. In still another aberration reducing process, the aberration is corrected continuously or successively several times.

Figure 10:
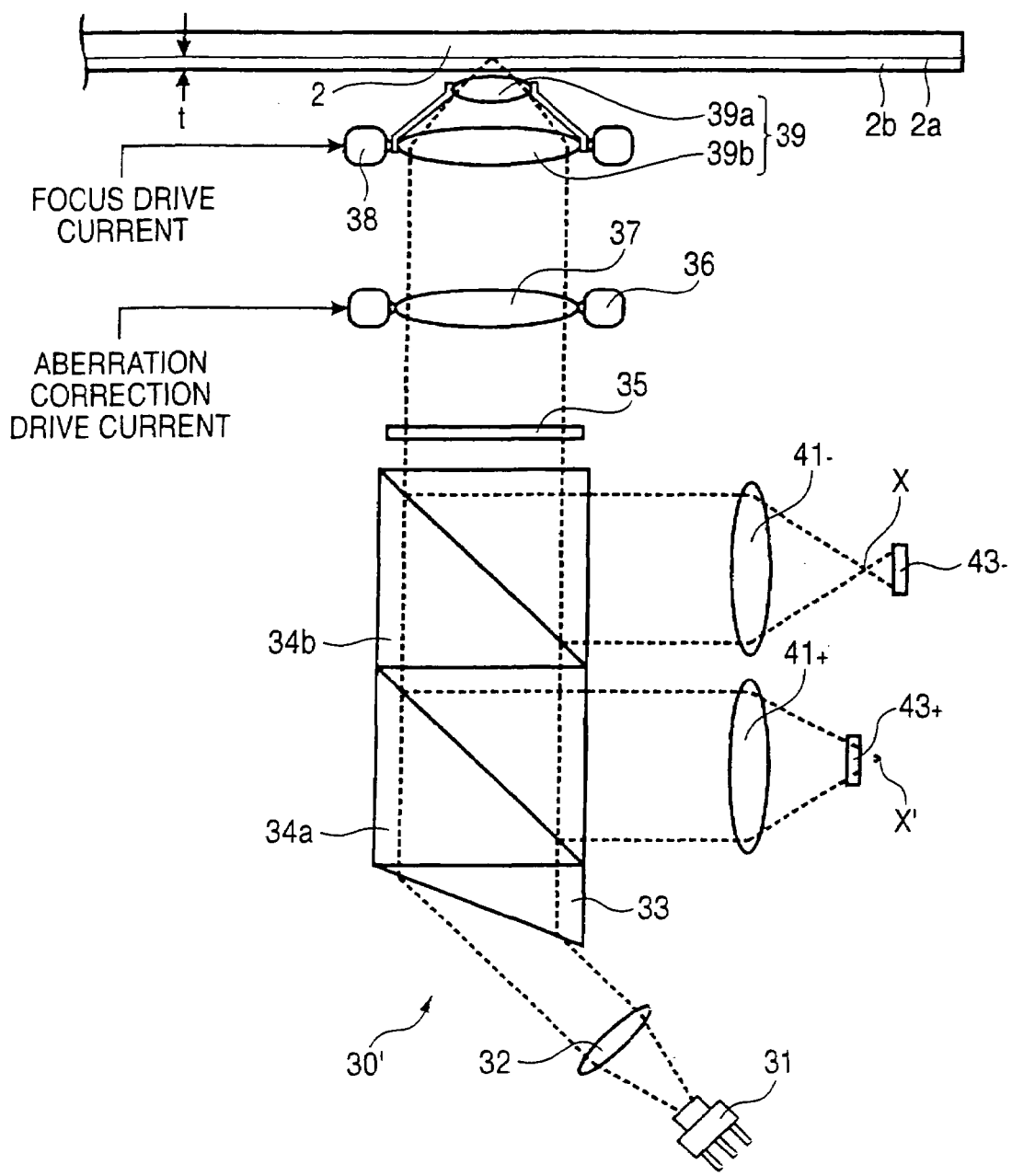
FIG. 10 is a diagram showing another optical pickup as one form of an optical signal detecting device constructed according to the invention.

FIG. 10 is a diagram showing another optical pickup as one form of an optical signal detecting device constructed according to the invention. Also in the instant embodiment, an optical pickup 30' is operable for both information reproducing and recording purposes. In FIG. 10, the same reference numerals are given to components having the same functions as those of the components in the optical pickup 30 shown in FIG. 3, and their detailed description is omitted.

A semiconductor laser device 31 is a semiconductor laser device in the instant optical pickup. The laser light emitted from the semiconductor laser device 31 is collimated by a collimator lens 32, and the collimated one enters the beam forming prism 33 which in turn reshapes the laser light into the laser light having a substantially complete round in cross section. Such a construction of the optical pickup is substantially the same as of the optical pickup shown in FIG. 3.

After passing through the beam forming prism 33, the laser light enters a first polarized light beam splitter 34a as a sort of half prism. A power-monitor photo diode (not shown) may be provided as in the case of FIG. 3. In this case, about 10% of the laser light emitted from the light source is reflected toward the power-monitor photo diode, and this diode monitors an intensity of laser light emitted from the semiconductor laser device 31.

The laser light emanating from the first polarized light beam splitter 34a passes through a second polarized light beam splitter 34b. The power-monitor photo diode may be positioned in association with the second polarized light beam splitter 34b in place of the first polarized light beam splitter 34a. After passing through the second polarized light beam splitter 34b, the laser light passes through the ¼ wavelength plate 35, the aberration correction lens 37 and the focus lens 39. The operation of the optical pickup thus far stated is substantially the same as of the optical pickup shown in FIG. 3.

As in the case shown in FIG. 3, the aberration correction lens 37 is held with an aberration correction actuator 36 containing a combination of a coil and a magnet as a major part, whereby those components form aberration correction means. Similarly, the focus lens 39 is held with a focus actuator 38 containing a combination of a coil and a magnet as a major part, whereby those components form another aberration correction means. Those lenses are adjusted in position by the aberration correction drive current and the focus drive current. In the optical pickup, the tracking is also adjusted by the tacking drive current fed from the tracking driver 23.

The laser light having passed through the focus lens 39 is incident on a reflecting surface 2a of the optical disc 2, through a protecting film 2b thereof. The laser light incident on the optical disc 2 is reflected on the reflecting layer of the optical disc to be a return laser light. The return laser light travels through the optical path through which the laser light traveled toward the optical disc; It travels through the focus lens 39 and the aberration correction lens 37, and then reaches the ¼ wavelength plate 35. The return laser light passes through the ¼ wavelength plate 35 to be a linearly polarized light rotated by 90° from the polarization direction of the laser light when it is incident on the ¼ wavelength plate 35. Thereafter, the return laser light enters the second polarized light beam splitter 34b.

When receiving the return laser light, the second polarized light beam splitter 34b reflects about 45% of the return laser light and allows the remaining return laser light, which is 55% of the return laser light, to pass therethrough. The laser light having passed through the second polarized light beam splitter 34b enters the first polarized light beam splitter 34a. When receiving the return laser light, the first polarized light beam splitter 34a reflects about 82% of the return laser light and permits the remaining laser light, which is 18% of the return laser light, to pass therethrough.

The lights reflected by the second and first polarized light beam splitters 34b and 34a are incident on a second cylindrical lens 41_ and a first cylindrical lens 41_+, which in turn condense the lights by their refraction.

The laser light that is reflected by the second polarized light beam splitter 34b and condensed by the second cylindrical lens 41_ images at the focal point X, and diverges, and is received by the second light receiving element 43_. The laser light that is reflected by the first polarized light beam splitter 34a and condensed by the first cylindrical lens 41_+0 is received by the first light receiving element 43_+ as the first light receiving element before it images at the focal point. The constructions of the first and second photo diodes 43_+ and 43_ are substantially the same as of the corresponding photo diodes shown in FIG. 7.

If the laser light pass through the first photo diode 43_+, the laser light that is condensed by the first cylindrical lens 41_+ will image at a point. Let this point be a virtual focal point X'. The first and second photo diodes 43_+ and 43_ are arranged so that a distance from the virtual focal point X' to the first photo diode 43_+ is selected to be substantially equal to a distance from the focal point X to the second light receiving element 43_. With such a diode arrangement, the images received by the laser light received by the first and second photo diodes 43_+ and 43_ are symmetrical in shape with each other in an ideal condition where no aberration is present.

In the instant embodiment, the two polarized light beam splitters, which are each a sort of half prism, are used for means for guiding the laser light to the photo diodes. If required, one or both of the polarized light beam splitters may be substituted by a parallel plane element, such as a half mirror, which permits part of light to pass therethrough and reflects the remaining part of light.

Also in the instant embodiment, it is preferable that each of the first and second photo diodes 43_+ and 43_ is arranged such that, as shown in FIG. 7, a track directional component of the laser light reflected by the optical disc 2 is vertical in orientation to a boundary line between the first light receiving area 43a and the second light receiving area 43b and a boundary line between the second light receiving area 43b and the third light receiving area 43c.

Figure 11:
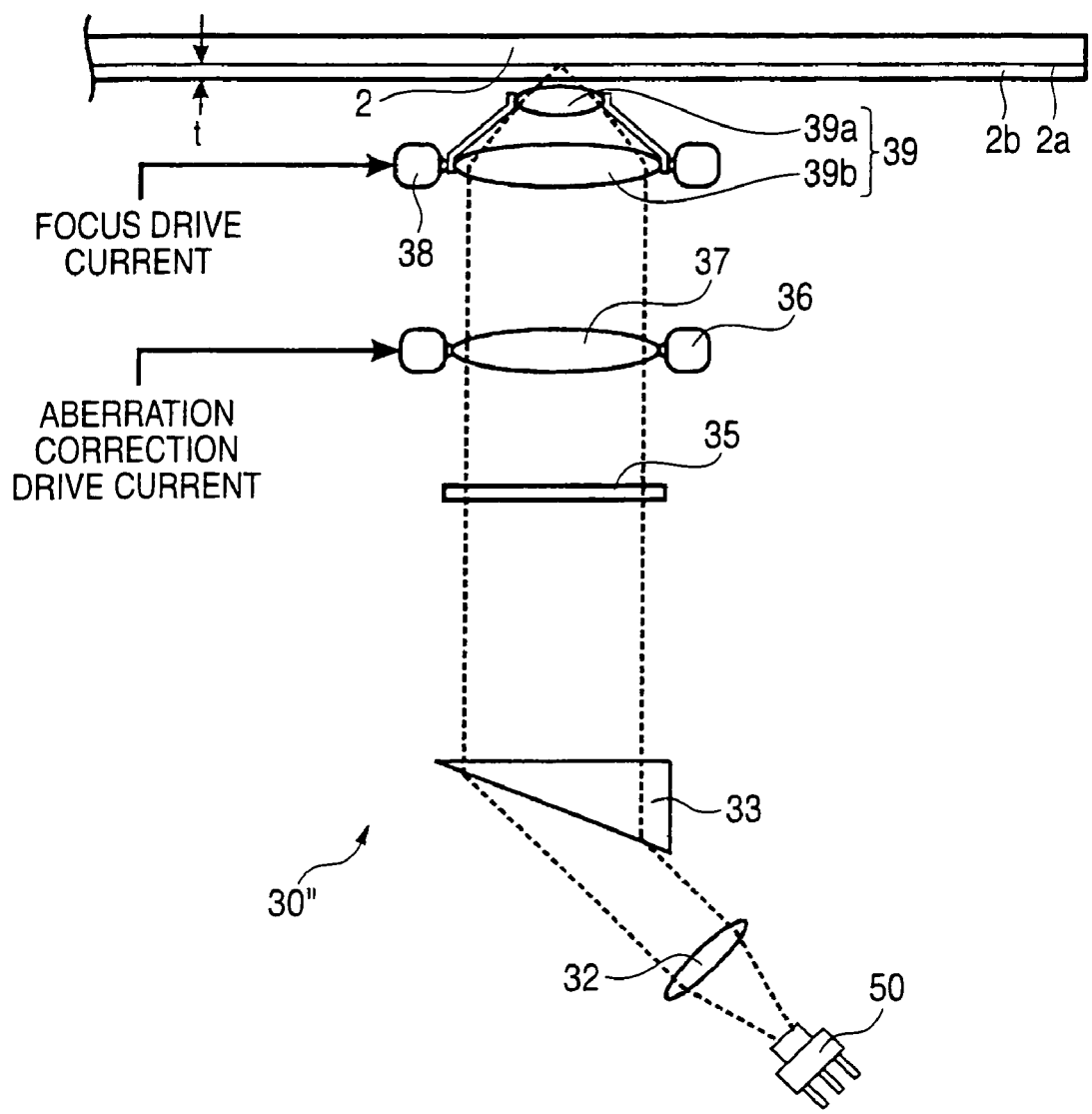
FIG. 11 is a diagram showing still another optical pickup as one form of an optical signal detecting device constructed according to the invention.

FIG. 11 is a diagram showing still another optical pickup as one form of an optical signal detecting device constructed according to the invention. In the instant embodiment, the photo diodes are contained in a semiconductor laser device as a light source. Also in the instant embodiment, an optical pickup 30" is operable for both information reproducing and recording purposes. In FIG. 10, the same reference numerals are given to components having the same functions as those of the components in the optical pickups 30 and 30' shown in FIGS. 3 and 10, and their detailed description is omitted.

Laser light emitted from a semiconductor laser device 50 capable of emitting and receiving light is collimated by a collimator lens 32, and enters a beam forming prism 33 where the laser light is reshaped into laser light having a complete round in cross section. Such a construction of the optical pickup is substantially the same as of the optical pickups 30 ad 30' shown in FIG. 3.

After passing through the beam forming prism 33, the laser light passes through the ¼ wavelength plate 35, the aberration correction lens 37 and the focus lens 39. The operation of the optical pickup thus far stated is also substantially the same as of the optical pickups shown in FIGS. 3 and 10.

As in the case shown in FIGS. 3 and 10, the aberration correction lens 37 is held with an aberration correction actuator 36 containing a combination of a coil and a magnet as a major part. Similarly, the focus lens 39 is held with a focus actuator 38 containing a combination of a coil and a magnet as a major part. Those lenses are adjusted in position by the aberration correction drive current fed from the aberration correction driver 24 and the focus drive current from the focus driver 22. In the optical pickup, the tracking is also adjusted by the tacking drive current fed from the tracking driver 23.

The laser light having passed through the focus lens 39 is incident on a reflecting surface 2a of the optical disc 2, through a protecting film 2b thereof. The laser light incident on the optical disc 2 is reflected on the reflecting layer of the optical disc to be a return laser light. The return laser light travels through the optical path through which the laser light traveled toward the optical disc; It travels through the focus lens 39 and the aberration correction lens 37, and then reaches the ¼ wavelength plate 35. The operation of the optical pickup thus far stated is also substantially the same as of the optical pickups shown in FIGS. 3 and 10.

The return laser light having passed through the ¼ wavelength plate 35 passes through the beam forming prism 33 again, is collimated by the collimator lens 32, and is received in the semiconductor laser device 50 capable of emitting and receiving light.

Figure 12:
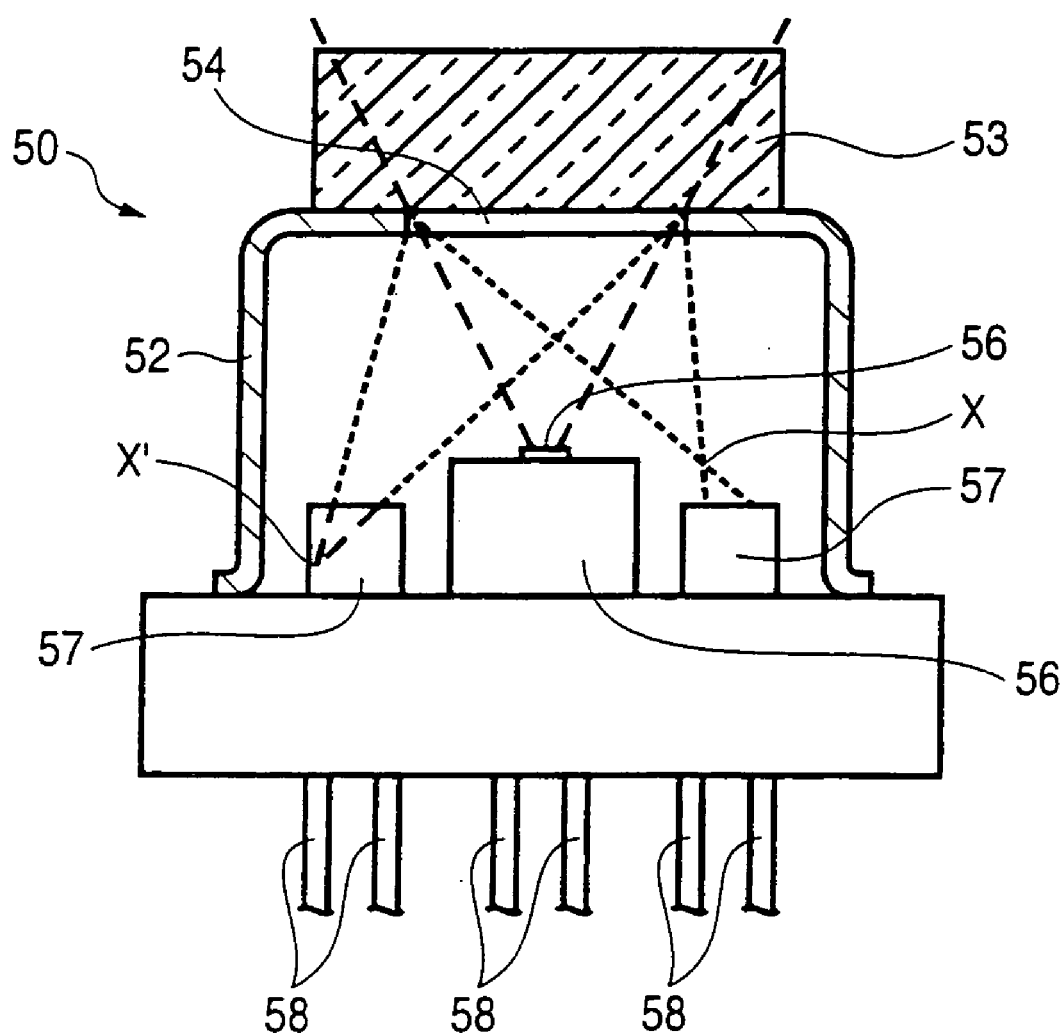
FIG. 12 is a model diagram showing in detail a semiconductor laser device capable of emitting and receiving light shown in FIG. 11.

FIG. 12 is a model diagram showing in detail a semiconductor laser device 50 capable of emitting and receiving light shown in FIG. 11. In the semiconductor laser device 50, a heat sink 56 is integrally provided on a disk-like base 51 made of insulating material. A semiconductor laser element 55 as a light emitting element is attached to the heat sink 56 in a state that a laser oscillating surface thereof is directed upward. Laser light emitted upward from the light emitting element 55 is irradiated on the optical disc 2 as shown in FIG. 11. A power-monitor photo diode (not shown) may be provided at a position where laser light generated by the light emitting element 55 can be received. In this case, an output power of the laser light generated by the light emitting element 55 is adjusted in accordance with detection result by the power-monitor photo diode.

A first photo diode 57_+ as a first light receiving element and a second photo diode 57_ as a second light receiving element, both diodes being for signal detection, are installed at positions where the laser light that is emitted from the light emitting element 55 and reflected by the optical disc can be received. The base 51 includes a plurality of lead wires 58 which pass through the base 51. The ends of the lead wires 58 appearing on the upper surface of the base 51 are electrically connected to the light emitting element 55 and the first and second photo diodes $57_+$ and $57_-$ by wire bonding (not shown).

The heat sink 56, the light emitting element 55, the first and second photo diodes $57_+$ and $57_-$, and the like which are on the base 51, are covered with an housing 52 bonded to the base 51. The housing 52 is cylindrical in shape. A bottom of the housing 52 is opened and an opening part 54 is formed in the top surface of the housing 52. The opening part 54 of the top surface is closed with a hologram 53 mounted on the top surface of the housing 52.

Normally, the inside of the housing 52 is formed with a transparent optical member. Sometimes, the housing is filled with a transparent fluid material, instead. The fluid material has such a transparency as to allow laser light having a wavelength generated by the light emitting element 55 to pass therethrough. Examples of such materials are silicone oil, fluorine inert liquid, and mineral oil.

In the optical pickup 30 thus constructed, laser light generated by the light emitting element 55 passes through the fluid material and the hologram 53 and reaches the optical disc.

The laser light that is reflected by the optical disc and collimated by the collimator lens 32 shown in FIG. 11 is spectrally split by the hologram 53, and reaches the first pulse signals before it images. The laser light images at an focal point X and diverges and in this state it reaches the second photo diode. If the laser light pass through the first photo diode $57_+$, it will image at a point. Let this point be a virtual focal point X'. The first and second photo diodes $57_+$ and $57_-$ are arranged such that a distance between the focal point X' and the first photo diode $57_+$ is selected to be substantially equal to a distance between an focal point X and the second photo diode $57_-$.

The first and second photo diodes $57_+$ and $57_-$ are similar in construction to those shown in FIG. 7. Each photo diode is segmented into two types of sectional areas. And, one type of sectional area is located between the other type of sectional areas. It is preferable that a boundary line between the first and second light receiving areas is oriented to be vertical to the parallel lines of the grating of the hologram 53.

Also in the instant embodiment, it is preferable that each of the first and second photo diodes $57_+$ and $57_-$ is arranged such that, as shown in FIG. 7, a track directional component of the laser light reflected by the optical disc 2 is vertical in orientation to a boundary line between the first light receiving area and the second light receiving area and a boundary line between the second light receiving area and the third light receiving area.

In all of the embodiments mentioned above, the device including the optical disc as the light receiving device, the aberration amount detecting circuit, the aberration control circuit, and the aberration correction driver may be operated as an aberration amount detecting device.

<Embodiment>

The present invention will be described in detail by using a specific example. In the example, a light receiving device similar to that described in connection with FIGS. 6 and 8 was used for the photo diodes as light receiving devices. In the description, discussion will be given to only the semi-circular area 45a in FIG. 8, exclusive of the remaining areas 45b and 45c. Light receiving elements as described referring to FIG. 7 were used for the photo diodes. A wavelength λ of laser light was 405 nm; λ=405 nm. A numerical aperture NA for the incoming optical path was 0.1; NA=0.1.

A η axis direction as a vertical direction of each image is coincident with a boundary line between the adjacent areas of those first o third areas. Accordingly, where the direction of the boundary line is vertical to the track direction 2c of the optical disc 2, a component of the track direction 2c shown in FIG. 6 is contained in a ξ axis direction as a lateral direction of each image. Further, where the parallel lines of the diffraction grating of the hologram are vertical to the boundary direction, a component of the grating is contained in the ξ axis direction as a lateral direction of each image.

Figure 13A:
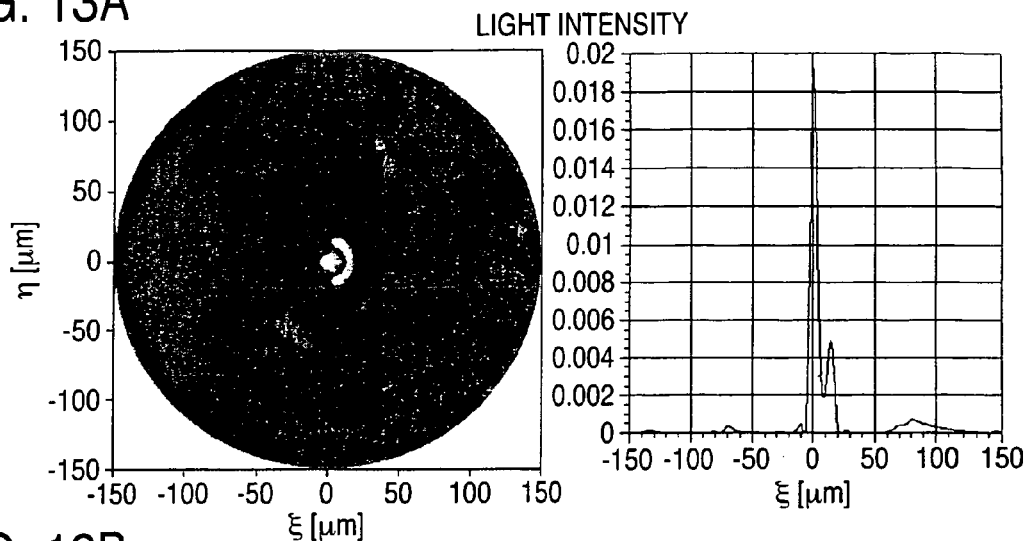
FIG. 13 is a diagram showing images appearing on a light receiving element, and distributions of light intensity along a lateral axis passing through the center of the image when a protecting layer of the optical disc is thinner than a FIG. 14 is a diagram showing images appearing on a light receiving element, and distributions of light intensity along a lateral axis passing through the center of the image when a protecting layer of the optical disc has a predetermined thickness of 0.1 mm.
Figure 13B:
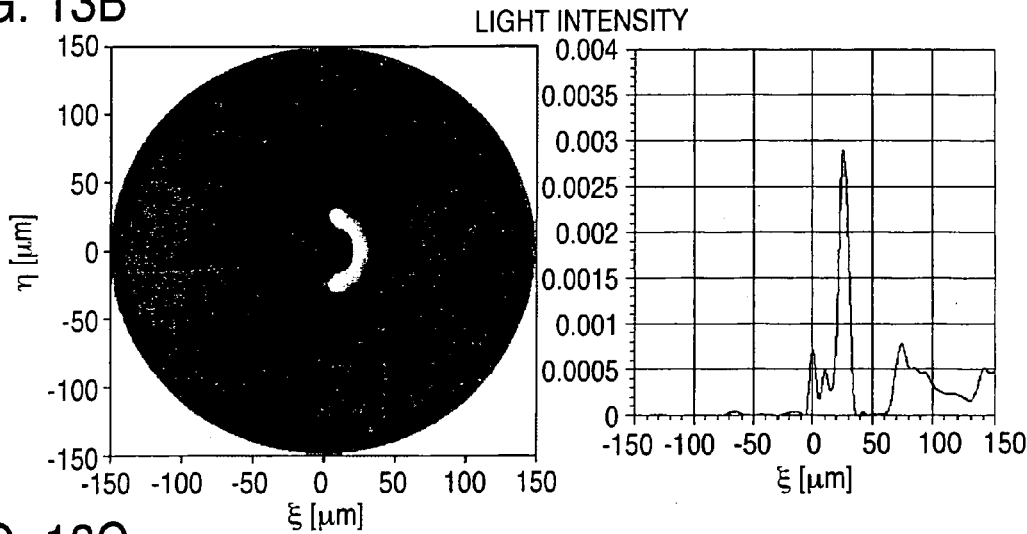
Figure 13C:
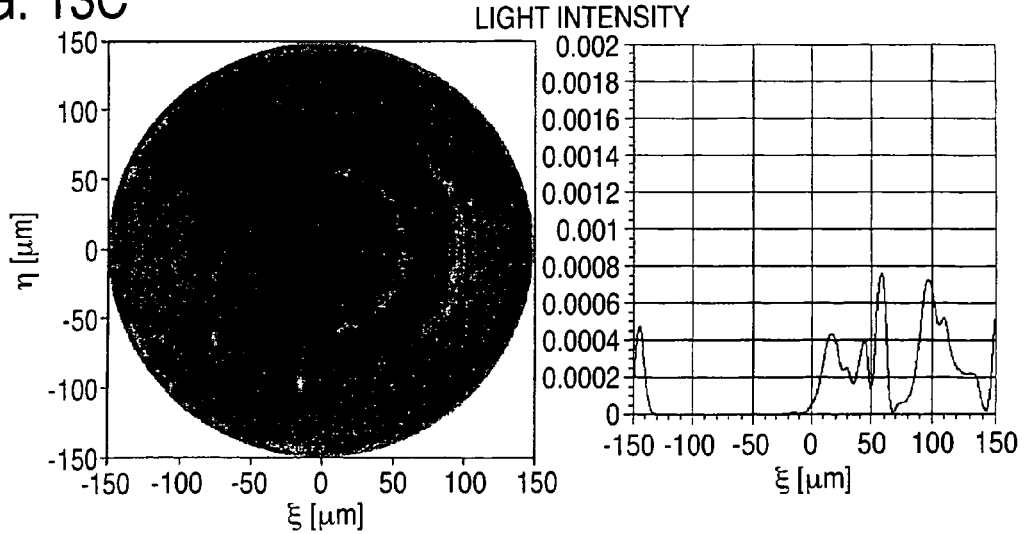

FIG. 13 is a diagram showing images appearing on a light receiving element and distributions of light intensity along a lateral axis passing through the center of the image when a protecting layer of the optical disc is thinner than a predetermined thickness of 0.1 mm by 20 μm.

A of FIG. 13 shows an image and a light intensity distribution at a point spaced apart from an focal point by $-500λ=0.203$ mm. As seen from the distribution graph, a light intensity curve sharply rises in the vicinity of ξ=0 μm. It is observed that a small peak of the curve appears in the vicinity of ξ=80 μm too.

B of FIG. 13 shows an image and a light intensity distribution at a point spaced apart from an focal point by $-1000λ=0.405$ mm. As seen from the distribution graph, a light intensity curve sharply rises in the vicinity of ξ=35 μm. This peak is lower in steepness than that in A of FIG. 13. It is observed that small peaks appear in the curve in a region of about 70 μm (=ξ) and longer.

C of FIG. 13 shows an image and a light intensity distribution at a point spaced apart from an focal point by $-2000λ=0.81$ mm. As seen also from the graph, peaks appear in the vicinity of ξ=20 μm and ξ=40 μm. Peaks appearing in the vicinity of ξ=60 μm and ξ=90 μm are somewhat higher than those in the vicinity of ξ=20 μm and ξ=40 μm.

Images at points distanced from the focal point by +500λ, +1000λ, and +2000λ are those obtained by turning back the images A, B and C point-symmetrically. The same thing is true for the graphs. The scale sizes of the ordinates of the graphs A, B and C are different from each other.

Figure 14A:
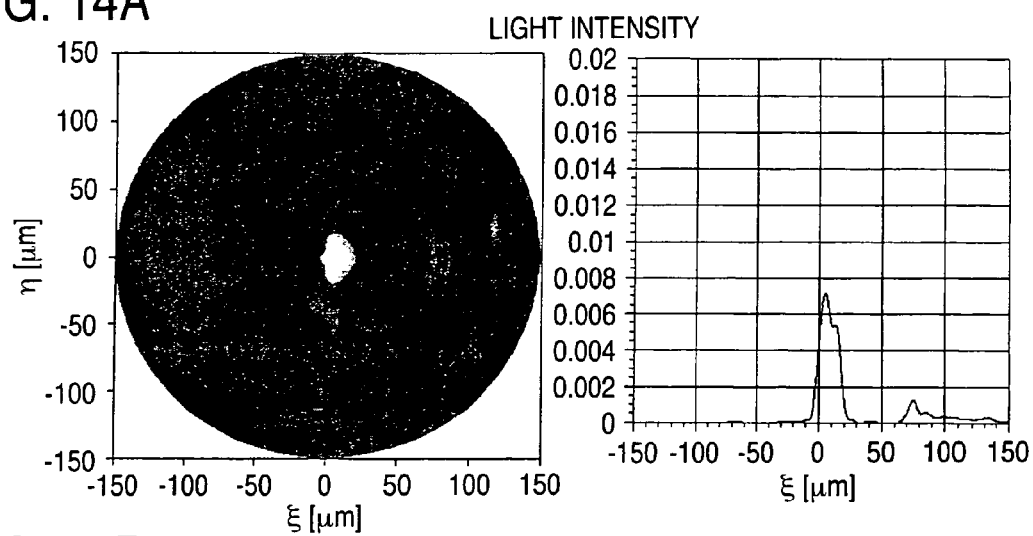
Figure 14B:
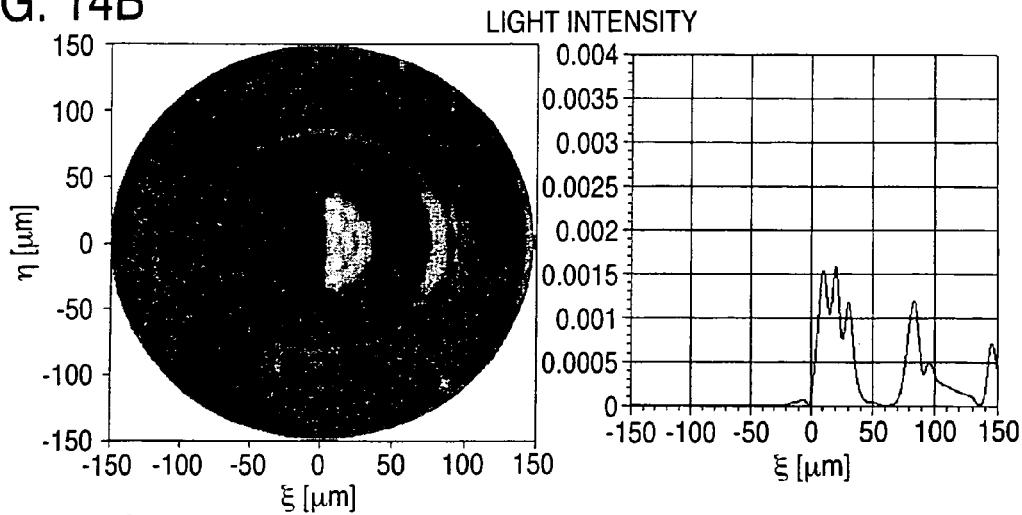
Figure 14C:
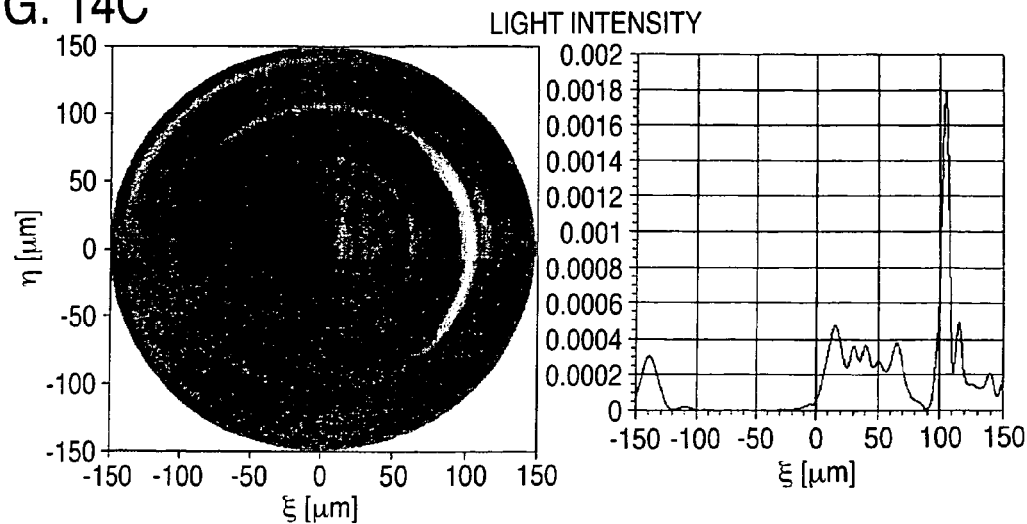

FIG. 14 is a diagram showing images appearing on a light receiving element, and distributions of light intensity along a lateral axis passing through the center of the image when a protecting layer of the optical disc has a predetermined thickness of 0.1 mm, viz., when no error is contained in the thickness dimension. In this case, no aberration occurs except the defocusing.

A of FIG. 14 shows an image and a light intensity distribution at a point spaced apart from an focal point by $-500λ=0.203$ mm. As seen from the distribution graph, a peak of the curve appears in the vicinity of ξ=5 μm.

B of FIG. 14 shows an image and a light intensity distribution at a point spaced apart from an focal point by $-1000λ=0.405$ mm. As seen from the distribution graph, peaks of the curve appears in the vicinity of ξ=10 μm, ξ=20 μm, and ξ=30 μm. Further, the curve peaks in the vicinity of ξ=80 μm.

C of FIG. 14 shows an image and a light intensity distribution at a point spaced apart from an focal point by $-2000λ=0.81$ mm. As seen from the distribution graph, gentle peaks of the curve appears in a region roughly ranging from ξ=10 μm to ξ=70 μm. Further, the curve sharply peaks in the vicinity of ξ=110 μm.

Images at points distanced from the focal point by +500λ, +1000λ, and +2000λ are those obtained by turning back the images A, B and C point-symmetrically. The same thing is true for the graphs. The scale sizes of the ordinates of the graphs A, B and C are different from each other.

Figure 15A:
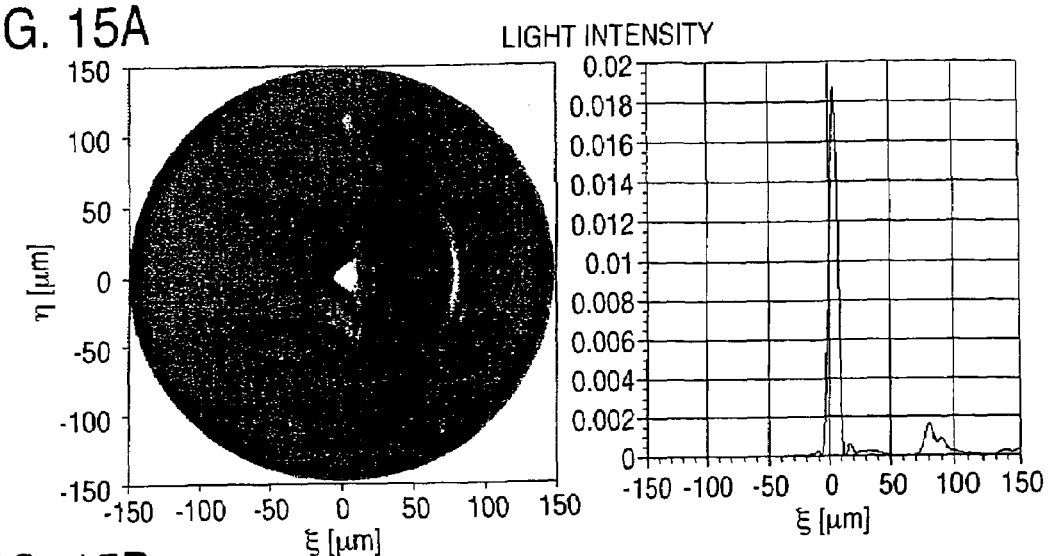
FIG. 15 is a diagram showing images appearing on a light receiving element, and distributions of light intensity along a lateral axis passing through the center of the image when a protecting layer of the optical disc is thinner than a predetermined thickness of 0.6 mm by 20 μm.
Figure 15B:
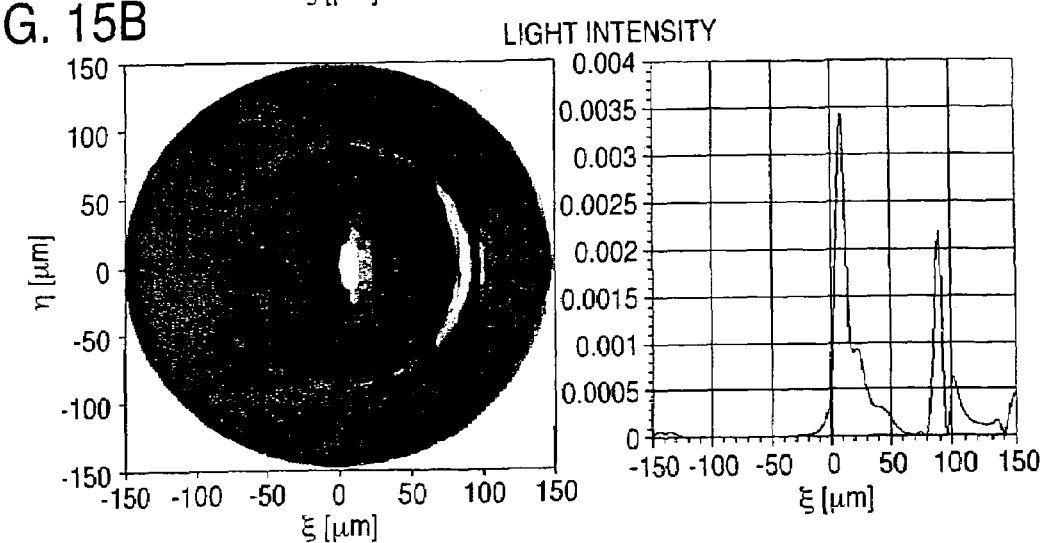
Figure 15C:
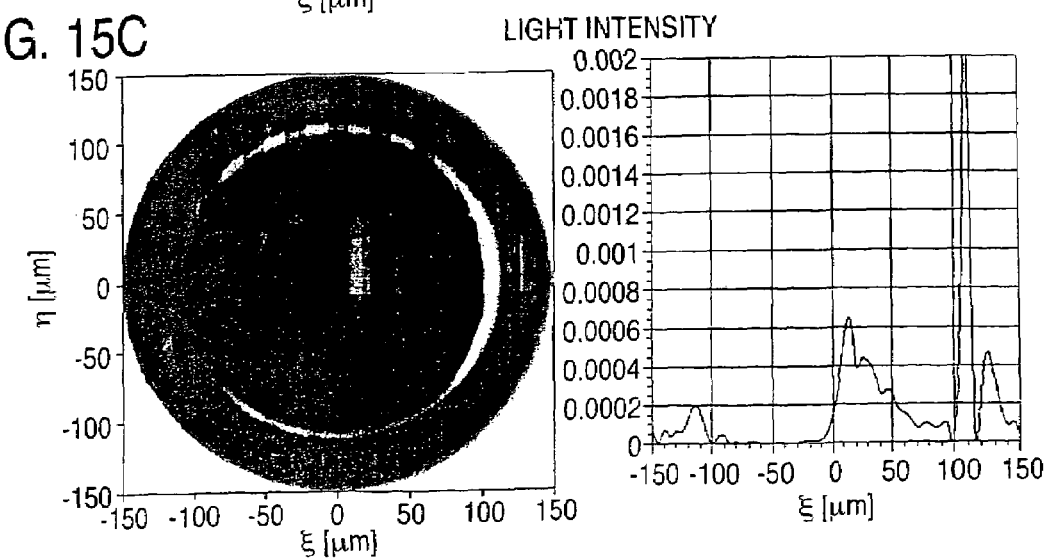

FIG. 15 is a diagram showing images appearing on a light receiving element, and distributions of light intensity along a lateral axis passing through the center of the image when a protecting layer of the optical disc is thinner than a predetermined thickness of 0.6 mm by 20 µm.

A of FIG. 15 shows an image and a light intensity distribution at a point spaced apart from an focal point by −500λ=0.203 mm. As seen from the distribution graph, the curve sharply rises in the vicinity of $\xi=5$ µm. Further, the curve peaks in the vicinity of $\xi=80$ µm too.

B of FIG. 15 shows an image and a light intensity distribution at a point spaced apart from an focal point by −1000λ=0.405 mm. As seen also from the distribution graph, a large peak appears in the vicinity of $\xi=10$ µm. This peak is lower in steepness than that in A of FIG. 15. A relatively large peak appears in the vicinity of $\xi=80$ µm, and a peak is observed also in the vicinity of $\xi=100$ µm.

C of FIG. 15 shows an image and a light intensity distribution at a point spaced apart from an focal point by −2000λ=0.81 mm. As seen also from the distribution graph, a gentle peak appears in the vicinity of $\xi=20$ µm, and a steep and strong peak appears in the vicinity of $\xi=110$ µm.

Images at points distanced from the focal point by +500λ, +1000λ, and +2000µ are those obtained by turning back the images A, B and C point-symmetrically. The same thing is true for the graphs. The scale sizes of the ordinates of the graphs A, B and C are different from each other.

FIGS. 16 and 17 are graphs showing variations of signals with respect to thickness errors of a protecting film, which are computed by use of a plurality of formulae, with the light receiving elements $43_+$ and $43_-$ described in connection with FIG. 8 being used. In this graph, an intensity distribution of a spot obtained by converting a thickness error to a corresponding spherical aberration amount, was computed through a simulation based on the scalar diffraction theory. And, an amount of light landing on each light receiving area was computed, whereby a signal output was obtained.

In the computations, a numerical aperture NA was 0.1 and the wavelength was 405 mm. In FIG. 16, a distance α from an focal point X to each of the light receiving elements $43_+$ and $43_-$ was 0.162 mm (400λ). In FIG. 17, a distance α from an focal point X to each of the light receiving elements $43_+$ and $43_-$ was 0.243 mm (600λ).

As seen from the graph of FIG. 16, a curve represented by $AB=(a_++b_++c_-)-(a_-+b_--c_+)$ indicated by a solid line little varies with respect to a protecting layer thickness error. Accordingly, in case of this condition, if this formula is used for detecting a focus error, a variation of the spherical aberration amount is little affected. And, hence, little interference occurs in the feedback control. The curves represented by $AB=(a_++b_-)-(a_-+b_+)$, $AB=(a_++b_++c_-)-(a_-+b_+-c_+)$, and $AB=(a_++b_-+c_+)-(a_-+b_++c_-)$ show that the signal output change gradually increases with respect to the protecting layer thickness error. Accordingly, it is seen that when those formulae are used, an aberration amount can be detected satisfactorily. Also when the detection formulae of $AB=(a_++b_+)-(a_-+b_-)$ and $AB=a_+-a_-$ were used, it was confirmed that the aberration detection was satisfactory, although not shown. In practical stage, it is suggestible to select appropriate formulae from those ones while considering operation circuit elements that can be used in the system.

In the graph of FIG. 17, a curve represented by $AB=(a_++b_++c_-)-(a_-+b_--c_+)$ indicated by a solid line varies with respect to a protecting layer thickness error. However, the curve varies in a direction that is opposite to a variation direction of each of the remaining curves in a region where the total width is small. When a thickness error of the protecting layer exceeds a range of ±20 µm, the output signal decreases in its level. Accordingly, where the aberration amount exceeds a predetermined value of it, there is the possibility that the protecting layer thickness is erroneously recognized. Accordingly, use of this condition is not appropriate to the detection of the aberration amount AB. The curves represented by $AB=(a_++b_-)-(b_++a_-)$, $AB=(a_++b_++c_-)-(a_-+b_+-c_+)$, and $AB=(a_++b_-+c_+)-(a_-+b_++c_-)$ show that the signal output change gradually increases with respect to the protecting layer thickness error. Accordingly, it is seen that when those formulae are used, an aberration amount can be detected satisfactorily. Thus, where a set of light receiving elements each having three segmental areas are arranged at fixed spatial intervals over a range from the focal point X to the photo diode 43, the aberration amount and the focus error can be detected by the detection formulae appropriately selected according to various factors, such as the distance from the focal point to the light receiving element.

Figure 18:
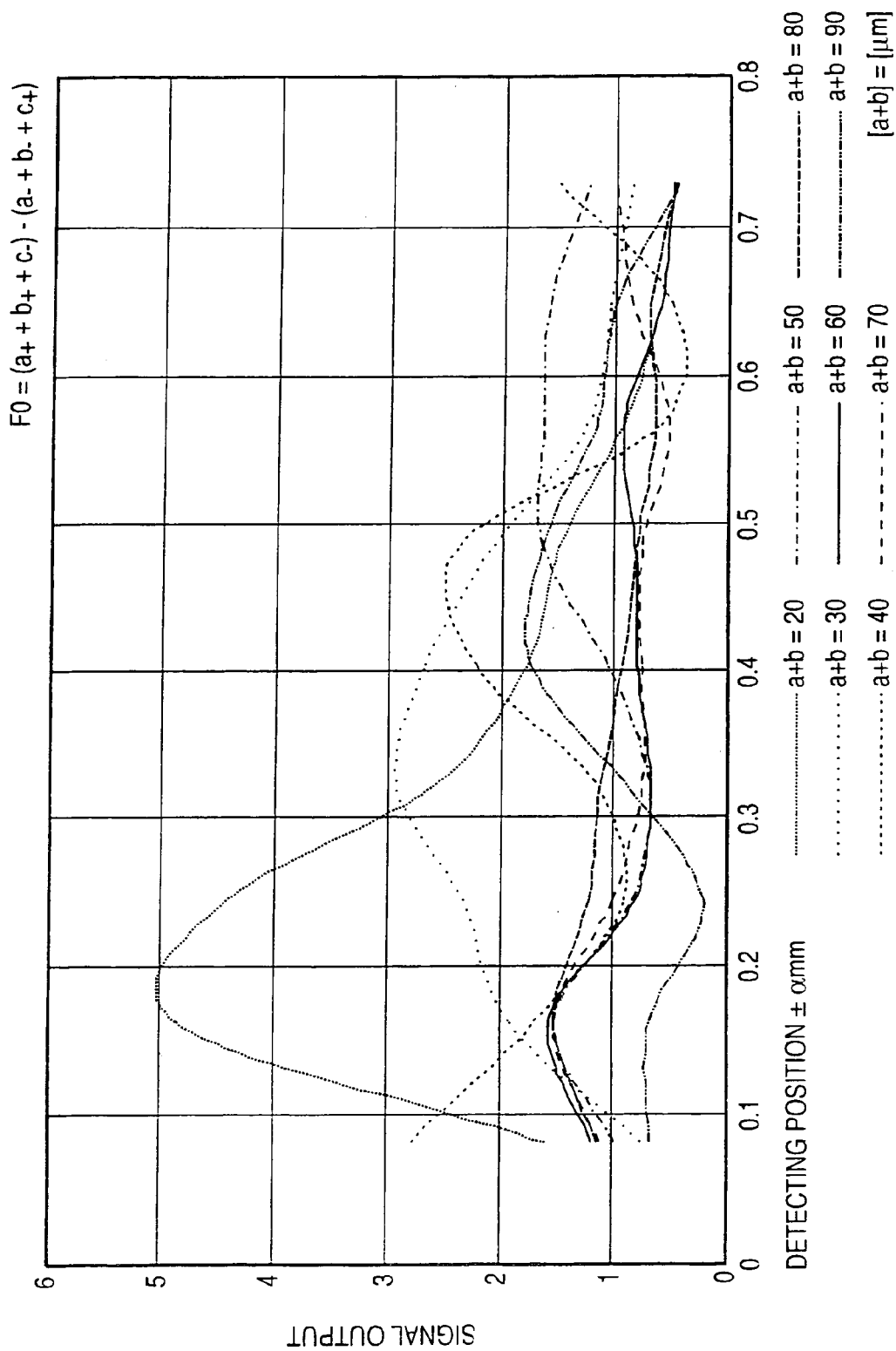
FIG. 18 is a graph showing variations of focus signals with respect to a distance between the focal point and the light receiving element, with parameters each being the total width of the first and second light receiving areas.

FIG. 18 is a graph showing variations of the focus correction amount of $FO=(a_++b_++c_-)-(a_-+b_-+c_+)$ with respect to a distance α from the focal point X to the photo diode 43. In the graph, the total width "a+b" of the first and second light receiving areas is appropriately varied. In the instant embodiment, the whole width of the light receiving element is fixed at 110 µm. Therefore, if the total width "a+b" of the first and second light receiving areas shown in FIG. 7 varies, the width of the third light receiving area also varies correspondingly. The graph shows that within a range from 0.1 to 0.5 mm of the distance from the focal point to each light receiving element, some curves exhibit great variations of the signal output value. When the distance from the focal point to each light receiving element exceeds 0.5 mm, the signal output value little varies for any of the total width "a+b" of the first and second light receiving areas.

In this instance, the focus correction amount is $FO=(a_++b_++c_-)-(a_-+b_-+c_+)$. The signal computing methods may be appropriately chosen according to design factors, such as an optical system and the width of the light receiving element. The computing results of the instant formula are typical ones. Other formulae will produce computing results resembling those by the formulae described above.

Figure 19:
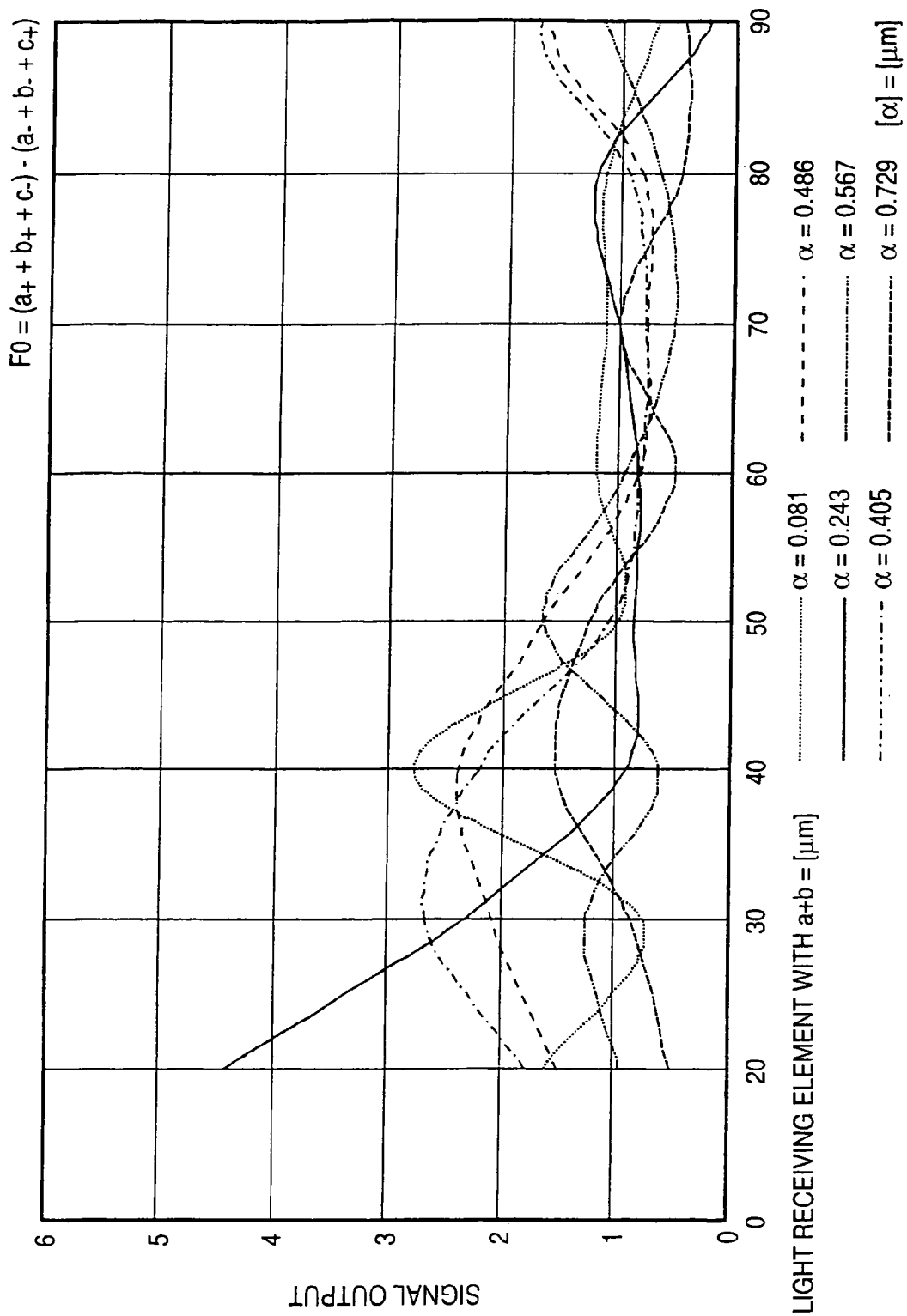
FIG. 19 is a graph showing variations of focus signals with respect to the total width of the first and second light receiving areas, with parameters each being distance between the focal point and the light receiving element.

FIG. 19 shows variations of focus correction signals each represented by $FO=(a_++b_++c_-)-(a_-+b_-+c_+)$ with respect to the total width of a width "a" of the first light receiving area 43a of the photo diode as the light receiving element described referring to FIG. 7 and a width "b" of the second light receiving area 43b of the same. In the graph, appropriately selected distances a from the focal point to the light receiving element were used.

As seen from the graph, in a region where the light receiving element width "a+b" exceeds 50 µm, no signal output is produced for any of the selected distances α from the focal point to the light receiving element. In other words, within a region where the total width "a+b" is 20 µm to 50 µm, the signal output is produced by appropriately selecting the distance a from the focal point to the light receiving element.

Also in the graphs shown in FIGS. 18 and 19, an intensity distribution of the spot was computed through a simulation based on the scalar diffraction theory, and an amount of light landing on each light receiving area was computed, whereby a signal output was obtained. In the computations, a numerical aperture NA was 0.1 and the wavelength was 405 mm.

As seen from the foregoing description, in the invention, the light receiving elements each having three light receiving areas are disposed at positions equidistantly spaced from the focal point. Computations may be appropriately performed by using the output signals from those light receiving areas. Hence, the aberration amount and the focus correction amount can be computed based on them. In particular, the light receiving elements are not positioned at the focal point, so that light may be landed on each light receiving area. As a result, it is easy to position and orient the light receiving elements.

What is claimed is:

1. A light receiving device having a condenser which generates condensed light, comprising:
    a first light receiving element, which receives the condensed light before the condensed light images; and
    a second light receiving element, which receives the condensed light after the condensed light images,
    wherein the first light receiving element and second light receiving element are disposed at positions equidistantly spaced from a focal point of the condensed light, and generate electrical signals based on light received by the light receiving elements,
    wherein each of the first light receiving element and second light receiving element includes:
    a first light receiving area, which receives a first portion of the condensed light which includes a optical axis of the condensed light;
    a second light receiving area, which receives a second portion of the condensed light which is located outside of the first portion of the condensed light; and
    a third light receiving area, which receives a third portion of the condensed light which is located outside of the second portion of the condensed light.

2. The light receiving device according to claim 1, wherein the first light receiving element and the second light receiving element are symmetrical with respect to a point located between the first light receiving element and the second light receiving element.

3. The light receiving device according to claim 1, wherein a width of the first light receiving area is larger than a width of the second light receiving area.

4. The light receiving device according to claim 1, wherein a width of the third light receiving area is larger than a width of each of the first and second light receiving areas.

5. The light receiving device according to claims 1, wherein a total width of the widths of the first and second light receiving areas is 20 to 50 µm.

6. The light receiving device according to claim 5, wherein each width of the first light receiving area and the second light receiving area are 10 to 30 µm.

7. The light receiving device according to claim 5, wherein the width of the third light receiving area is 40 to 180 µm.

8. The light receiving device according to claim 1, wherein the first light receiving element and second light receiving element are located at positions spaced apart from the focal point of the light by a distance of 0.1 to 0.5 mm.

9. The light receiving device according to claim 1, wherein the first light receiving element receives one of lights spectrally split by a splitter, and the second light receiving element receives the other split light.

10. The light receiving device according to claim 9, wherein the splitter is at least one of a half prism, a parallel plane element, and a hologram element.

11. The light receiving device according to claim 10, wherein in a case where a hologram is used as the splitter, a boundary line between the first light receiving area and second light receiving area, and a boundary line between the second light receiving area and third light receiving area, are substantially vertical to a grating of the hologram.

12. The light receiving device according to claim 1, wherein the condensed light is light reflected from an optical recording medium.

13. The light receiving device according to claim 12, wherein a boundary line between the first light receiving area and second light receiving area, and a boundary line between the second light receiving area and third light receiving area, are substantially vertical to a direction of a component of the reflected light in a track direction of the optical recording medium.

14. The light receiving device according to claim 1, further comprising:
    an aberration correction driver, which generates an aberration correction drive current based on the output signals of the first light receiving element and second light receiving element,
    an aberration corrector, which corrects a quantity of aberration of the light reflected from the optical recording medium in accordance with the aberration correction drive current.

15. A light detecting device comprising:
    a first light receiving element, which receives the condensed light before the condensed light images; and
    a second light receiving element, which receives the condensed light after the condensed light images,
    wherein the first light receiving element and second light receiving element are disposed at positions equidistantly spaced from a focal point of the condensed light, and generate electrical signals based on light received by the light receiving elements,
    wherein each of the first light receiving element and second light receiving element includes:
    a first light receiving area, which receives a first portion of the condensed light which includes a optical axis of the condensed light;
    a second light receiving area, which receives a second portion of the condensed light which is located outside of the first portion of the condensed light;
    a third light receiving area, which receives a third portion of the condensed light which is located outside of the second portion of the condensed light; and
    an aberration amount detecting circuit, which detects an aberration amount by using the output signals of the first light receiving element and second light receiving element.

16. The light detecting device according to claim 15, wherein the aberration amount AB is detected by using at least one of the following equations:

$$AB = a_+ - a_-$$

$$AB = (a_+ + b_-) - (b_+ + a_-),$$

$$AB = (a_+ + b_- + c_-) - (a_- + b_+ + c_+),$$

$$AB = (a_+ + b_+ + c_-) - (a_- + b_- + c_+),$$

$$AB = (a_+ + b_- + c_+) - (a_- + b_+ + c_-),$$

$$AB = (a_+ + b_+) - (a_- + b_-)$$

where $a_+$ is an output signal derived from the first light receiving area of the first light receiving element, $b_+$ is an output signal derived from the first light receiving area of the first light receiving element, and $c_+$ is an output signal derived from the third light receiving area of the first light receiving element, $a_-$ is an output signal derived from the first light receiving area of the second light receiving element, $b_-$ is an output signal derived from the second light receiving area of the second light receiving element, and $c_-$ is an output signal derived from the third light receiving area of the second light receiving element.

17. A light detecting device comprising:

a first light receiving element, which receives the condensed light before the condensed light images; and a second light receiving element, which receives the condensed light after the condensed light images, wherein the first light receiving element and second light receiving element are disposed at positions equidistantly spaced from a focal point of the condensed light, and generate electrical signals based on light received by the light receiving elements, wherein each of the first light receiving element and second light receiving element includes:

a first light receiving area, which receives a first portion of the condensed light which includes a optical axis of the condensed light;

a second light receiving area, which receives a second portion of the condensed light which is located outside of the first portion of the condensed light;

a third light receiving area, which receives a third portion of the condensed light which is located outside of the second portion of the condensed light; and a focus correction amount detecting circuit for detecting a focus correction amount by using the output signals of said first light receiving element and second light receiving element.

18. The light detecting device according to claim 17, wherein said focus correction amount FO is detected by using any of the following equations:

$$FO = a_+ + a_-$$

$$FO = (a_+ + b_-) - (b_+ + a_-),$$

$$FO = (a_+ + b_- + c_-) - (a_- + b_+ + c_+),$$

$$FO = (a_+ + b_+ + c_-) - (a_- + b_- + c_+),$$

$$FO = (a_+ + b_- + c_+) - (a_- + b_+ + c_-),$$

$$FO = (a_+ + b_+) - (a_- + b_-)$$

where $a_+$ is an output signal derived from the first light receiving area of the first light receiving element, $b_+$ is an output signal derived from the second light receiving area of the first light receiving element, $c_+$ is an output signal derived from the third light receiving area of the first light receiving element, $a_-$ is an output signal derived from the first light receiving area of the second light receiving element, $b_-$ is an output signal derived from the second light receiving area of the second light receiving element, and $c_-$ is an output signal derived from the third light receiving are of the second light receiving element.

19. An optical signal reproducing device, which reproduces a signal recorded in an optical recording medium, the optical signal reproducing device comprising:

a light detecting device comprising:

a first light receiving element, which receives the condensed light before the condensed light images; and a second light receiving element, which receives the condensed light after the condensed light images, wherein the first light receiving element and second light receiving element are disposed at positions equidistantly spaced from a focal point of the condensed light, and generate electrical signals based on light received by the light receiving elements, wherein each of the first light receiving element and second light receiving element includes:

a first light receiving area, which receives a first portion of the condensed light which includes a optical axis of the condensed light;

a second light receiving area, which receives a second portion of the condensed light which is located outside of the first portion of the condensed light;

a third light receiving area, which receives a third portion of the condensed light which is located outside of the second portion of the condensed light; and an aberration amount detecting circuit, which detects an aberration amount by using the output signals of the first light receiving element and second light receiving element.

20. An optical signal reproducing device, which reproduces a signal recorded in an optical recording medium, the optical signal reproducing device comprising:

a first light receiving element, which receives the condensed light before the condensed light images; and a second light receiving element, which receives the condensed light after the condensed light images, wherein the first light receiving element and second light receiving element are disposed at positions equidistantly spaced from a focal point of the condensed light, and generate electrical signals based on light received by the light receiving elements, wherein each of the first light receiving element and second light receiving element includes:

a first light receiving area, which receives a first portion of the condensed light which includes a optical axis of the condensed light;

a second light receiving area, which receives a second portion of the condensed light which is located outside of the first portion of the condensed light;

a third light receiving area, which receives a third portion of the condensed light which is located outside of the second portion of the condensed light; and a focus correction amount detecting circuit for detecting a focus correction amount by using the output signals of said first light receiving element and second light receiving element.

* * * * *